United States Patent
Elshafie et al.

(10) Patent No.: US 11,792,643 B2
(45) Date of Patent: Oct. 17, 2023

(54) TECHNIQUES FOR PARAMETER USAGE TRACKING FOR ENCRYPTION

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/496,417

(22) Filed: Oct. 7, 2021

(65) Prior Publication Data

US 2023/0116090 A1    Apr. 13, 2023

(51) Int. Cl.
*H04W 12/037* (2021.01)
*H04L 5/00* (2006.01)
*H04W 72/20* (2023.01)

(52) U.S. Cl.
CPC ......... *H04W 12/037* (2021.01); *H04L 5/0048* (2013.01); *H04W 72/20* (2023.01)

(58) Field of Classification Search
CPC  H04W 12/033; H04W 12/041; H04L 9/0822; H04L 2209/80
See application file for complete search history.

(56) References Cited

U.S. PATENT DOCUMENTS

| 8,738,913 B2 * | 5/2014 | Hahn | H04L 63/0428 |
| | | | 713/170 |
| 2010/0098247 A1 * | 4/2010 | Suumaki | H04L 9/0866 |
| | | | 380/44 |

FOREIGN PATENT DOCUMENTS

| WO | WO-2009136981 A1 * | 11/2009 | ............. H04L 63/10 |
| WO | WO-2012077999 A2 * | 6/2012 | ........... H04L 63/065 |
| WO | WO-2013008990 A1 * | 1/2013 | ........... H04L 63/104 |
| WO | WO-2021192059 A1 * | 9/2021 | |

\* cited by examiner

*Primary Examiner* — Kevin Kim
(74) *Attorney, Agent, or Firm* — QUALCOMM Incorporated

(57) ABSTRACT

Methods, systems, and devices for wireless communication are described. Devices may synchronize parameters associated with an encryption key to avoid a key mismatch. In a first example, a transmitter and a receiver may each update a respective parameter at each transmission occasion associated with semi-statically allocated resources, regardless of whether signaling is transmitted in the transmission occasion. In a second example, the transmitter and the receiver may each update the respective parameter based on a slot count, rather than at each transmission occasion. In a third example, the transmitter may indicate a value of a transmitter parameter to the receiver, for example in control signaling or in the signaling in each transmission occasion. In a fourth example, the receiver may be enabled to identify a skipped transmission occasion The receiver may be enabled with a feedback process to indicate the receiver recognized the associated transmission occasion was skipped.

30 Claims, 13 Drawing Sheets

TECHNIQUES FOR PARAMETER USAGE TRACKING FOR ENCRYPTION

FIELD OF TECHNOLOGY

The following relates to wireless communication, including techniques for parameter usage tracking for encryption.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices (e.g., base stations and UEs) may secure communications using encryption keys. In some cases, however, existing techniques for encryption key usage may be deficient.

SUMMARY

The described techniques relate to improved methods, systems, devices, and apparatuses that support techniques for parameter usage tracking for encryption. Generally, the described techniques provide for enabling devices (e.g., a base station and a user equipment (UE)) to synchronize parameters associated with an encryption key to avoid a key mismatch. In a first example, a transmitting device and a receiving device may each update a respective parameter at each transmission occasion associated with semi-statically allocated resources, regardless of whether signaling is transmitted in the transmission occasion. In a second example, the transmitting device and the receiving device may each update the respective parameter based on a slot count, rather than at each transmission occasion. That is, the devices may use an encryption key for a duration, rather than a quantity of transmissions. In a third example, the transmitting device may indicate a value of a transmitter parameter to the receiving device, for example in control signaling or in the signaling in each transmission occasion. In a fourth example, the receiving device may be enabled to identify a skipped transmission occasion, for example based on signaling (e.g., reference signals) transmitted in the skipped transmission occasion. The receiving device may be enabled with a three-state feedback process, including an acknowledgment (ACK), a negative ACK (NACK), and a third feedback state which may indicate the receiving device recognized the associated transmission occasion was skipped (e.g., discontinuous transmission (DTX)). The transmitting device may recognize that the receiving device did not update the transmitter parameter based on the DTX feedback, or both the transmitting device and receiving device may update respective parameters based on the DTX feedback.

A method for wireless communication at a transmitting device is described. The method may include transmitting, to a receiving device, a first signal in a first transmission occasion associated with semi-statically allocated resources, the first signal encoded based on a value of a transmitter parameter associated with an encryption key, updating the value of the transmitter parameter based on a second transmission occasion associated with the semi-statically allocated resources, the second transmission occasion including an empty transmission occasion, and transmitting, to the receiving device, a second signal in a third transmission occasion after the second transmission occasion, the second signal encoded based on updating the value of the transmitter parameter.

An apparatus for wireless communication at a transmitting device is described. The apparatus may include a memory and a processor coupled to the memory and configured to transmit, to a receiving device, a first signal in a first transmission occasion associated with semi-statically allocated resources, the first signal encoded based on a value of a transmitter parameter associated with an encryption key, update the value of the transmitter parameter based on a second transmission occasion associated with the semi-statically allocated resources, the second transmission occasion including an empty transmission occasion, and transmit, to the receiving device, a second signal in a third transmission occasion after the second transmission occasion, the second signal encoded based on updating the value of the transmitter parameter.

Another apparatus for wireless communication at a transmitting device is described. The apparatus may include means for transmitting, to a receiving device, a first signal in a first transmission occasion associated with semi-statically allocated resources, the first signal encoded based on a value of a transmitter parameter associated with an encryption key, means for updating the value of the transmitter parameter based on a second transmission occasion associated with the semi-statically allocated resources, the second transmission occasion including an empty transmission occasion, and means for transmitting, to the receiving device, a second signal in a third transmission occasion after the second transmission occasion, the second signal encoded based on updating the value of the transmitter parameter.

A non-transitory computer-readable medium storing code for wireless communication at a transmitting device is described. The code may include instructions executable by a processor to transmit, to a receiving device, a first signal in a first transmission occasion associated with semi-statically allocated resources, the first signal encoded based on a value of a transmitter parameter associated with an encryption key, update the value of the transmitter parameter based on a second transmission occasion associated with the semi-statically allocated resources, the second transmission occasion including an empty transmission occasion, and transmit, to the receiving device, a second signal in a third transmission occasion after the second transmission occasion, the second signal encoded based on updating the value of the transmitter parameter.

Some examples of the method, apparatuses, and non-transitory computer-readable medium described herein may further include operations, features, means, or instructions for transmitting, to the receiving device, an indication of the updated value of the transmitter parameter based on updating the value of the transmitter parameter.

In some examples of the method, apparatuses, and non-transitory computer-readable medium described herein, the indication may be included in the second signal in the third transmission occasion.

In some examples of the method, apparatuses, and non-transitory computer-readable medium described herein, the indication may be included in a downlink control information message or a sidelink control information message.

Some examples of the method, apparatuses, and non-transitory computer-readable medium described herein may further include operations, features, means, or instructions for receiving, from the receiving device, a feedback message corresponding to the second transmission occasion, where updating the value of the transmitter parameter may be based on receiving the feedback message.

In some examples of the method, apparatuses, and non-transitory computer-readable medium described herein, the feedback message includes an acknowledgment, a negative acknowledgment, an indication of discontinuous transmission, or any combination thereof.

Some examples of the method, apparatuses, and non-transitory computer-readable medium described herein may further include operations, features, means, or instructions for transmitting, to the receiving device, a reference signal in the second transmission occasion, where updating the value of the transmitter parameter may be based on transmitting the reference signal.

Some examples of the method, apparatuses, and non-transitory computer-readable medium described herein may further include operations, features, means, or instructions for determining the value of the transmitter parameter based on a slot index corresponding to the second transmission occasion, where updating the value of the transmitter parameter may be based on determining the value of the transmitter parameter.

Some examples of the method, apparatuses, and non-transitory computer-readable medium described herein may further include operations, features, means, or instructions for refraining from transmitting signaling in the second transmission occasion, where updating the value of the transmitter parameter may be based on refraining from transmitting the signaling.

In some examples of the method, apparatuses, and non-transitory computer-readable medium described herein, the semi-statically allocated resources may be associated with a semi-persistent scheduling configuration or a configured grant configuration.

In some examples of the method, apparatuses, and non-transitory computer-readable medium described herein, the transmitter parameter includes a transmitter counter and updating the value of the transmitter parameter includes incrementing the transmitter counter.

In some examples of the method, apparatuses, and non-transitory computer-readable medium described herein, the transmitting device includes a base station and the receiving device includes a user equipment and the transmitting device includes the user equipment and the receiving device includes the base station.

In some examples of the method, apparatuses, and non-transitory computer-readable medium described herein, the transmitting device includes a first user equipment and the receiving device includes a second user equipment.

A method for wireless communication at a receiving device is described. The method may include receiving, from a transmitting device, a first signal in a first transmission occasion associated with semi-statically allocated resources, the first signal decoded at the receiving device based on a value of a receiver parameter associated with an encryption key, updating the value of the receiver parameter based on receiving the first signal in the first transmission occasion, monitoring for signaling in a second transmission occasion associated with the semi-statically allocated resources, updating the value of the receiver parameter based on monitoring for the signaling in the second transmission occasion, and receiving, from the transmitting device, a second signal in a third transmission occasion after the second transmission occasion, the second signal decoded at the receiving device based on updating the value of the receiver parameter.

An apparatus for wireless communication at a receiving device is described. The apparatus may include a memory and a processor coupled to the memory and configured to receive, from a transmitting device, a first signal in a first transmission occasion associated with semi-statically allocated resources, the first signal decoded at the receiving device based on a value of a receiver parameter associated with an encryption key, update the value of the receiver parameter based on receiving the first signal in the first transmission occasion, monitor for signaling in a second transmission occasion associated with the semi-statically allocated resources, update the value of the receiver parameter based on monitoring for the signaling in the second transmission occasion, and receive, from the transmitting device, a second signal in a third transmission occasion after the second transmission occasion, the second signal decoded at the receiving device based on updating the value of the receiver parameter.

Another apparatus for wireless communication at a receiving device is described. The apparatus may include means for receiving, from a transmitting device, a first signal in a first transmission occasion associated with semi-statically allocated resources, the first signal decoded at the receiving device based on a value of a receiver parameter associated with an encryption key, means for updating the value of the receiver parameter based on receiving the first signal in the first transmission occasion, means for monitoring for signaling in a second transmission occasion associated with the semi-statically allocated resources, means for updating the value of the receiver parameter based on monitoring for the signaling in the second transmission occasion, and means for receiving, from the transmitting device, a second signal in a third transmission occasion after the second transmission occasion, the second signal decoded at the receiving device based on updating the value of the receiver parameter.

A non-transitory computer-readable medium storing code for wireless communication at a receiving device is described. The code may include instructions executable by a processor to receive, from a transmitting device, a first signal in a first transmission occasion associated with semi-statically allocated resources, the first signal decoded at the receiving device based on a value of a receiver parameter associated with an encryption key, update the value of the receiver parameter based on receiving the first signal in the first transmission occasion, monitor for signaling in a second transmission occasion associated with the semi-statically allocated resources, update the value of the receiver parameter based on monitoring for the signaling in the second transmission occasion, and receive, from the transmitting device, a second signal in a third transmission occasion after the second transmission occasion, the second signal decoded at the receiving device based on updating the value of the receiver parameter.

Some examples of the method, apparatuses, and non-transitory computer-readable medium described herein may further include operations, features, means, or instructions for receiving, from the transmitting device, an indication of an updated value of a transmitter parameter, where updating the value of the receiver parameter based on monitoring for the signaling in the second transmission occasion may be further based on receiving the indication.

In some examples of the method, apparatuses, and non-transitory computer-readable medium described herein, the indication may be received in the second signal in the third transmission occasion.

In some examples of the method, apparatuses, and non-transitory computer-readable medium described herein, the indication may be received in a downlink control information message or a sidelink control information message.

Some examples of the method, apparatuses, and non-transitory computer-readable medium described herein may further include operations, features, means, or instructions for transmitting, to the transmitting device, a feedback message corresponding to the second transmission occasion, where updating the value of the receiver parameter based on monitoring for the signaling in the second transmission occasion may be further based on transmitting the feedback message.

In some examples of the method, apparatuses, and non-transitory computer-readable medium described herein, the feedback message includes an acknowledgment, a negative acknowledgment, an indication of discontinuous transmission, or any combination thereof.

Some examples of the method, apparatuses, and non-transitory computer-readable medium described herein may further include operations, features, means, or instructions for receiving, from the transmitting device, a reference signal in the second transmission occasion, where updating the value of the receiver parameter based on monitoring for the signaling in the second transmission occasion may be further based on transmitting the reference signal.

Some examples of the method, apparatuses, and non-transitory computer-readable medium described herein may further include operations, features, means, or instructions for determining the value of the receiver parameter based on a slot index corresponding to the second transmission occasion, where updating the value of the receiver parameter based on monitoring for the signaling in the second transmission occasion may be further based on determining the value of the receiver parameter.

In some examples of the method, apparatuses, and non-transitory computer-readable medium described herein, the semi-statically allocated resources may be associated with a semi-persistent scheduling configuration or a configured grant configuration.

In some examples of the method, apparatuses, and non-transitory computer-readable medium described herein, the receiver parameter includes a receiver counter and updating the value of the receiver parameter includes incrementing the receiver counter.

In some examples of the method, apparatuses, and non-transitory computer-readable medium described herein, the transmitting device includes a base station and the receiving device includes a user equipment and the transmitting device includes the user equipment and the receiving device includes the base station.

In some examples of the method, apparatuses, and non-transitory computer-readable medium described herein, the transmitting device includes a first user equipment and the receiving device includes a second user equipment.

DETAILED DESCRIPTION

Figure 1:
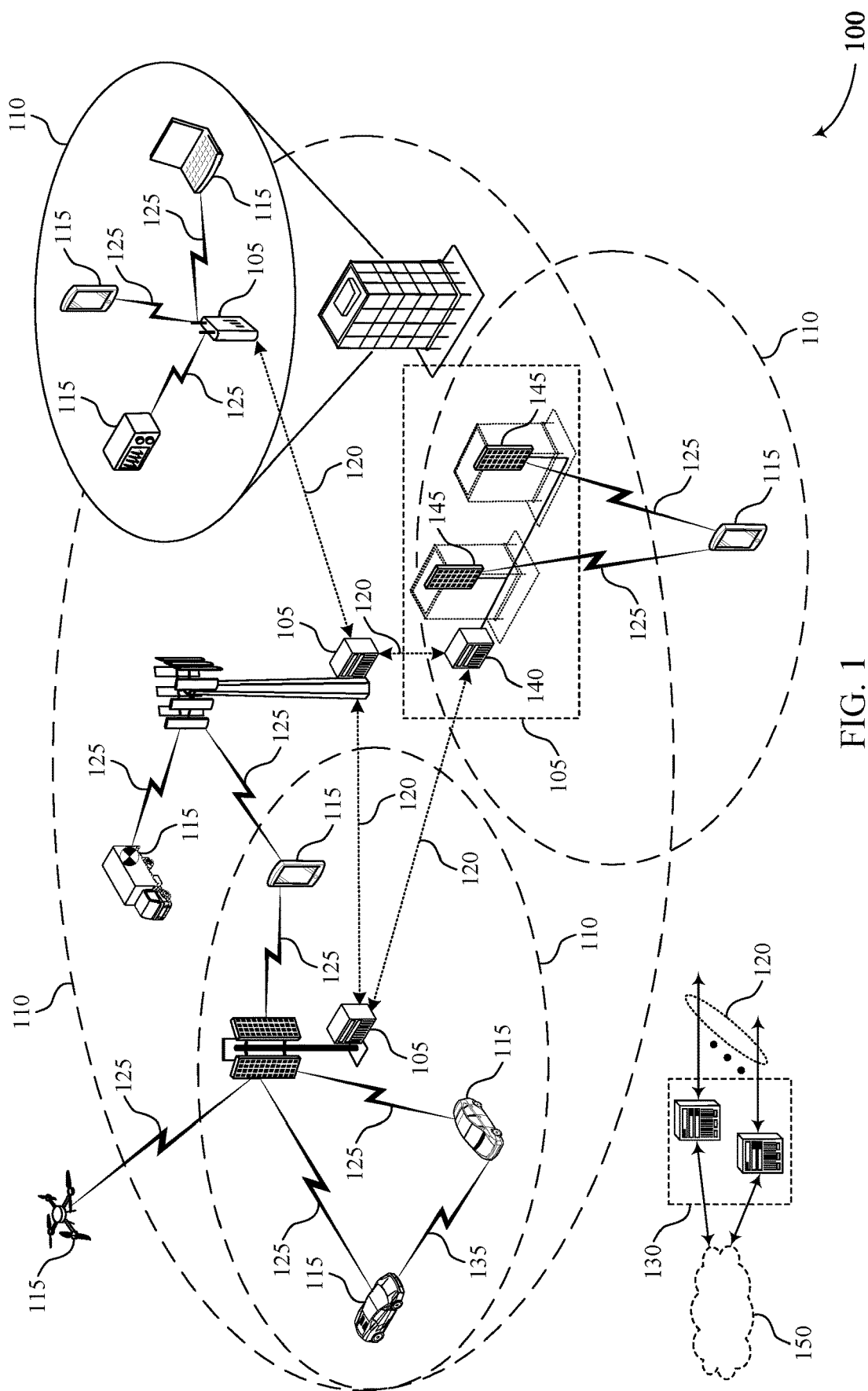
FIG. 1 illustrates an example of a wireless communications system that supports techniques for parameter usage tracking for encryption in accordance with aspects of the present disclosure.

In some wireless communications systems, a transmitting device and a receiving device (e.g., a base station and a user equipment (UE), or two UEs in sidelink communications) may use a shared encryption key to secure communications. For each transmission encoded using the encryption key, the transmitting device and the receiving device may each update a respective parameter (e.g., increment a value of a counter). The transmitting device and the receiving device may refresh the shared encryption key when the devices determine the encryption key has expired (e.g., based on the value of the counter satisfying a threshold), for example according to an algorithm. In some cases, such as in semi-static communications (e.g., semi-persistent scheduling (SPS) downlink transmissions, configured grant (CG) uplink transmissions, or CG sidelink transmissions), a key mismatch may occur when the transmitting device skips a transmission occasion (e.g., the transmitting device may refrain from transmitting in a transmission occasion). For example, the transmitting device may not update a transmitter parameter at the skipped transmission occasion, but the receiving device may update a receiver parameter, as the receiving device may be unable to distinguish between a skipped occasion and a failure to receive at the receiving device. It may be beneficial for the devices to avoid a key mismatch to improve communications reliability.

According to the techniques described herein, devices may synchronize parameters associated with an encryption key to avoid a key mismatch. In a first example, a transmitting device and a receiving device may each update a respective parameter at each transmission occasion associated with semi-statically allocated resources, regardless of whether signaling is transmitted in the transmission occasion. In a second example, the transmitting device and the receiving device may each update the respective parameter based on a slot count, rather than at each transmission occasion. That is, the devices may use an encryption key for a duration, rather than a quantity of transmissions. In a third example, the transmitting device may indicate a value of a transmitter parameter to the receiving device, for example in control signaling or in the signaling in each transmission occasion. In a fourth example, the receiving device may be enabled to identify a skipped transmission occasion, for example based on signaling (e.g., reference signals) transmitted in the skipped transmission occasion. The receiving device may be enabled with a three-state feedback process, including an acknowledgment (ACK), a negative ACK (NACK), and a third feedback state which may indicate the receiving device recognized the associated transmission occasion was skipped (e.g., discontinuous transmission (DTX)). The transmitting device may recognize that the receiving device did not update the receiver parameter based on the DTX feedback, or both the transmitting device and receiving device may update respective parameters based on the DTX feedback.

Aspects of the disclosure are initially described in the context of wireless communications systems. Aspects of the disclosure are further illustrated by and described with reference to a transmission scheme, a process flow, apparatus diagrams, system diagrams, and flowcharts that relate to techniques for parameter usage tracking for encryption.

FIG. 1 illustrates an example of a wireless communications system 100 that supports techniques for parameter usage tracking for encryption in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described here, devices (e.g., a base station 105 and a UE 115, or two UEs 115 in sidelink communications) may synchronize parameters associated with an encryption key to avoid a key mismatch. In a first example, a transmitting device and a receiving device may each update a respective parameter at each transmission occasion associated with semi-statically allocated resources, regardless of whether signaling is transmitted in the transmission occasion. In a second example, the transmitting device and the receiving device may each update the respective parameter based on a slot count, rather than at each transmission occasion. That is, the devices may use an encryption key for a duration, rather than a quantity of transmissions. In a third example, the transmitting device may indicate a value of a transmitter parameter to the receiving device, for example in control signaling or in the signaling in each transmission occasion. In a fourth example, the receiving device may be enabled to identify a skipped transmission occasion, for example based on signaling (e.g., reference signals) transmitted in the skipped transmission occasion. The receiving device may be enabled with a three-state feedback process, including an ACK, a NACK, and a third feedback state which may indicate the receiving device recognized the associated transmission occasion was skipped (e.g., DTX). The transmitting device may recognize that the receiving device did not update the receiver parameter based on the DTX feedback, or both the transmitting device and receiving device may update respective parameters based on the DTX feedback.

Figure 2:
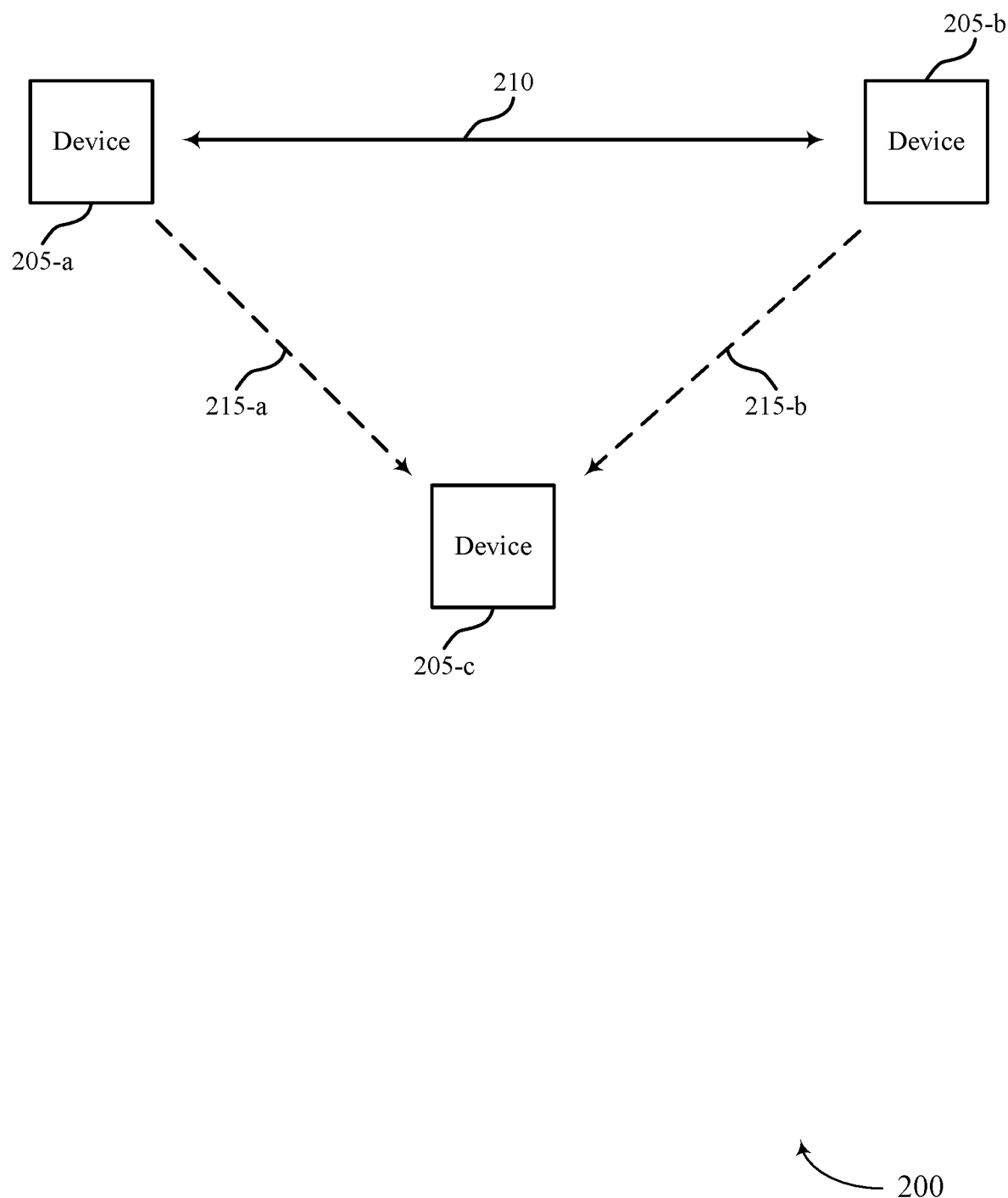
FIG. 2 illustrates an example of a wireless communications system that supports techniques for parameter usage tracking for encryption in accordance with aspects of the present disclosure.

FIG. 2 illustrates an example of a wireless communications system 200 that supports techniques for parameter usage tracking for encryption in accordance with aspects of the present disclosure. In some examples, the wireless communications system 200 may implement aspects of the wireless communications system 100. For example, the wireless communications system 200 may include one or more devices 205, each of which may be an example of a UE 115 or a base station 105 described with reference to FIG. 1. The wireless communications system 200 may include features for improved communications between the devices 205, among other benefits.

Devices 205-*a* and 205-*b* may communicate via a communication link 210, which may be an example of a communication link 125 (which may be referred to as a Uu link) or a D2D communication link 135 (e.g., a sidelink connection) described with reference to FIG. 1. The devices 205-*a* and 205-*b* may secure communications on the communication link 210 to prevent eavesdropping by a device 205-*c* (e.g., via channels 215-*a* and 215-*b*). For example, the devices 205-*a* and 205-*b* may use physical layer security schemes to secure the communications, such as in IoT communications.

The security scheme may be based on an encryption key shared between the devices 205-*a* and 205-*b*. In some cases, the devices 205-*a* and 205-*b* may refresh the encryption key when the devices 205-*a* and 205-*b* determine the encryption key has expired. For example, each device 205 may maintain a respective counter associated with the encryption key. For each transmission on the communication link 210 encoded, encrypted, or scrambled using the encryption key, each device 205 may increment (e.g., add one to) a value of the counter maintained at the device 205. When the counter satisfies a threshold (e.g., when the encryption key is used X times, where X is a quantity of physical channel occasions), the devices 205 may consider the encryption key expired and refresh the encryption key, for example based on an algorithm. Additionally or alternatively, the devices 205 may assume a degradation in security of the encryption key after each usage of the encryption key. When a degradation level satisfies a threshold (e.g., the security falls below the threshold), the devices 205 may consider the encryption key expired and refresh the encryption key. In some examples, the encryption scheme may use both the encryption key and the value of the counter to secure the communications. In such examples, a mismatch between the values of the transmitter counter and the receiver counters may make the receiver device unable to decrypt communications.

In some cases, such as for semi-statically allocated resources (e.g., SPS downlink transmissions, CG uplink transmissions, or CG sidelink transmissions), a key mismatch may occur at a skipped transmission occasion. For example, in SPS downlink transmissions, where the transmitting device 205-*a* is a base station and the receiving device 205-*b* is a UE, the transmitting device 205-*a* may skip a physical downlink shared channel (PDSCH) occasion (e.g., the PDSCH occasion is an empty transmission occasion). At the skipped PDSCH occasion, the transmitting device 205-*a* may not increment a transmitter counter, while the receiving device 205-*b* may increment a receiver counter, leading to a key mismatch. For example, the receiving device 205-*b* may be unable to distinguish between a skipped PDSCH occasion and a failure to receive a transmission at the device 205-*b* (e.g., the device 205-*b* may transmit a NACK message associated with the skipped PDSCH occasion). That is, at the skipped PDSCH occasion, the device 205-*b* (e.g., a UE) may assume the encryption key was used for a transmission (e.g., and increment a value of the receiver counter) while the transmitting device 205-*a* (e.g., a base station) may assume the encryption key was not used (e.g., and not increment a value of the transmitter counter). Similarly, in CG uplink transmissions, at a skipped physical uplink shared channel (PUSCH) occasion, the receiving device 205-*b* (e.g., a base station) may assume the encryption key was used for a transmission (e.g., and increment a value of the receiver counter) while the transmitting device 205-*a* (e.g., a UE) may assume the encryption key was not used (e.g., and not increment a value of the transmitter counter). A counter may be used as part of an encryption scheme to provide an added measure of security to the communications. For example, a counter may track a quantity of transmissions sent using an encryption key. The counter may be used to ensure that every communication is encrypted using a unique code (e.g., a combination of the encryption key and the counter value) or may be used to determine when the encryption key expires or both. In other examples, different parameters may be used as part of the encryption scheme to provide added measures of security.

According to the techniques described herein, devices 205 may synchronize parameters associated with an encryption key to avoid a key mismatch. In a first example, the devices 205-a and 205-b may each update a respective parameter at each transmission occasion associated with semi-statically allocated resources, regardless of whether signaling is transmitted in the transmission occasion. That is, at each PUSCH/PDSCH occasion, the devices 205-a and 205-b may assume the key was used, and the devices 205-a and 205-b may count key expiration and key refresh times accordingly. In a second example, the devices 205-a and 205-b may each update the respective parameter based on a slot count, rather than at each transmission occasion. That is, the devices 205-a and 205-b may use an encryption key for a duration (e.g., a quantity of milliseconds, symbols, subslots, or slots), rather than a quantity of transmissions.

In a third example, the transmitting device 205-a may indicate a value of a transmitter parameter to the receiving device 205-b, such as in control signaling or in the signaling in each transmission occasion. Based on receiving the indicated value of the transmitter parameter, the receiving device 205-b may update a value of a receiver parameter (e.g., to match the indicated value of the transmitter parameter). For example, a downlink control information (DCI) message may include a counter field (e.g., similar to a downlink assignment index). Additionally or alternatively, the transmitting device 205-a may include (e.g., piggyback) the counter field in a PDSCH or PUSCH occasion to indicate a quantity of uses of the current encryption key.

In a fourth example, the receiving device 205-b may be enabled to identify a skipped transmission occasion. For example, in SPS downlink transmissions, the receiving device 205-b (e.g., a UE) may be enabled with a three-state feedback process for transmitting to the transmitting device 205-a. The feedback process may include an ACK, a NACK, and a third feedback state which may indicate the receiving device 205-b recognized the associated transmission occasion was skipped (e.g., based on DTX). The transmitting device 205-a may recognize that the receiving device 205-b did not update a receiver parameter based on the DTX feedback, or both the transmitting device 205-a and the receiving device 205-b may update respective parameters based on the DTX feedback.

Similarly, in CG uplink transmissions, the receiving device 205-b (e.g., a base station) may report DTX feedback based on detecting a reference signal (e.g., a demodulation reference signal (DMRS)) in the skipped transmission occasion. The transmitting device 205-a (e.g., a UE) may transmit the reference signal even when there is no data to transmit in the skipped occasion. The transmitting device 205-a may recognize that the receiving device 205-b did not update a receiver parameter based on the DTX feedback, or both the transmitting device 205-a and the receiving device 205-b may update respective parameters based on the DTX feedback.

In some examples, such as when the communication link 210 is a sidelink connection, and the devices 205-a and 205-b are UEs, each transmission occasion may be associated with a respective sidelink control information (SCI) message. The transmitting device 205-a may include an indication of the value of the transmitter parameter in an SCI message (e.g., an SCI-1 or SCI-2 message), and so the transmitting device 205-a and the receiving device 205-b may be aware of the quantity of uses of the encryption key.

Figure 3:
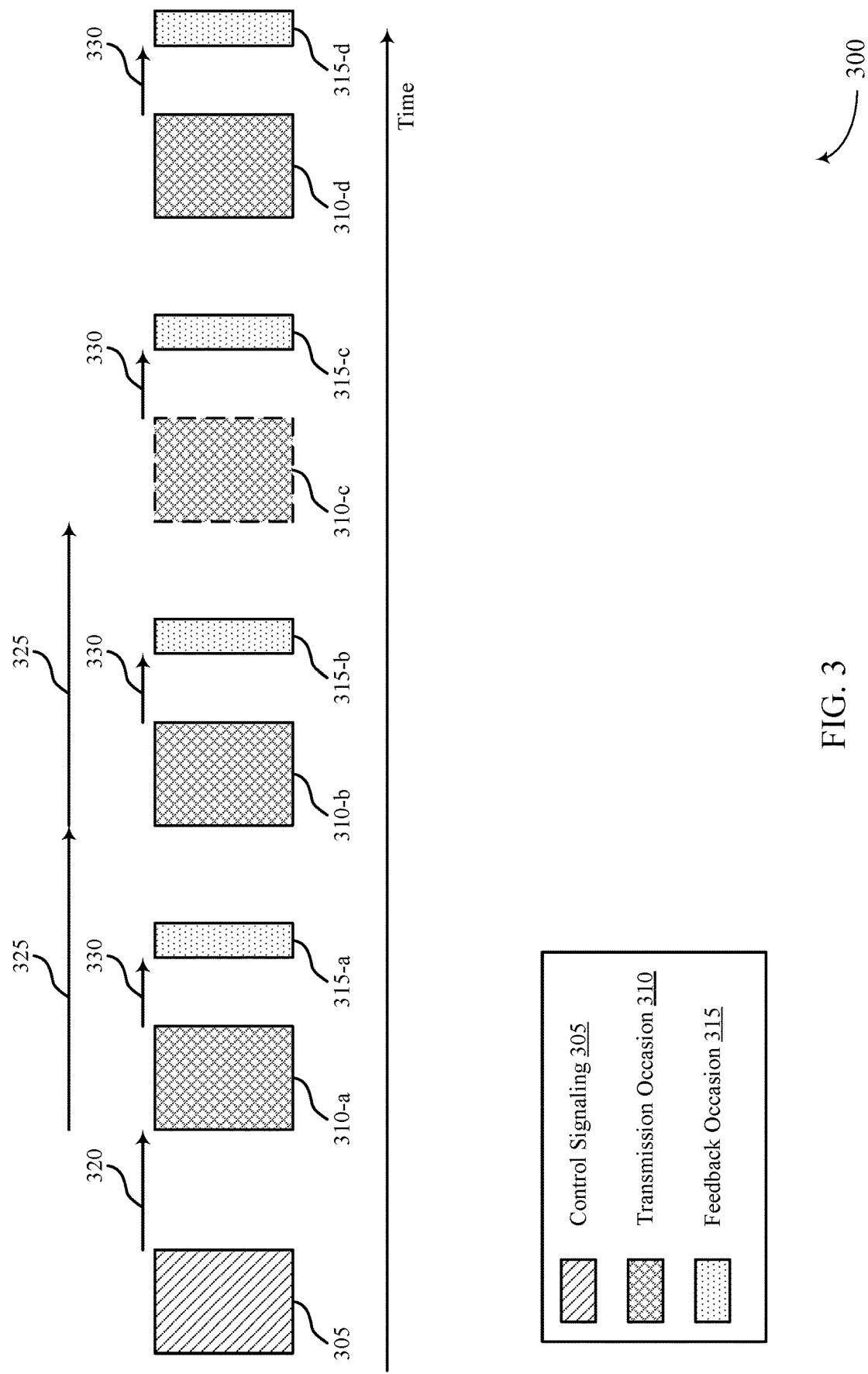
FIG. 3 illustrates an example of a transmission scheme that supports techniques for parameter usage tracking for encryption in accordance with aspects of the present disclosure.

FIG. 3 illustrates an example of a transmission scheme 300 that supports techniques for parameter usage tracking for encryption in accordance with aspects of the present disclosure. In some examples, the transmission scheme 300 may implement aspects of the wireless communications system 100 or the wireless communications system 200. For example, the transmission scheme 300 may illustrate communication between devices in a wireless communications system, each of which may be an example of a device 205 described with reference to FIG. 2, or a UE 115 or a base station 105 described with reference to FIG. 1. The transmission scheme 300 may include features for improved communication reliability, among other benefits.

The transmission scheme 300 may include control signaling 305 (e.g., a DCI message or an SCI message), which may schedule one or more transmission occasions 310 and corresponding feedback occasions 315 in a semi-static resource allocation (e.g., for SPS downlink transmissions, CG uplink transmissions, or CG sidelink transmissions). For example, in an SPS allocation, each transmission occasion 310 may include a PDSCH occasion in which a base station may transmit data, and each feedback occasion 315 may include a physical uplink control channel (PUCCH) in which a UE may transmit feedback (e.g., ACK or NACK) associated with the corresponding PDSCH occasion, as well as additional channel state information (CSI). In some examples, the transmission scheme 300 may include one or more transmission occasions 310 (e.g., a transmission occasion 310-d) scheduled by a dynamic grant rather than the semi-static resource allocation.

A scheduling offset 320 (which may be referred to as K0) may separate (in a time domain) a slot in which the control signaling 305 is received and a slot in which a first transmission occasion 310-a is scheduled. A periodicity 325 may separate each transmission occasion 310 scheduled by the semi-static resource allocation. A feedback offset 330 (which may be referred to as K1) may separate each transmission occasion 310 and a corresponding feedback occasion 315. A scheduling device (e.g., a base station or a UE) may indicate the scheduling offset 320, the periodicity 325, and the feedback offset 330 in the control signaling 305 scheduling the semi-static resource allocation.

A transmitting device and a receiving device may secure communications in the transmission occasions 310 using an encryption key. For each transmission encoded, encrypted, or scrambled using the encryption key, the transmitting device and the receiving device may each update a respective parameter (e.g., increment a value of a counter). The transmitting device and the receiving device may refresh the encryption key when the devices determine the encryption key has expired. In some cases, however, the transmitting device may skip a transmission occasion 310-c, for example if the transmitting device determines the transmitting device does not have data to send in the transmission occasion 310-c or if the transmitting device determines channel conditions are unfavorable for transmitting in the transmission occasion 310-c. In some cases, a key mismatch associated with the encryption key may occur based on the skipped transmission occasion 310-c. For example, the transmitting device may not update a transmitter parameter (e.g., increment a value of a transmitter counter) based on skipping the transmission occasion 310-c, while the receiving device may be unable to distinguish between a skipped transmission occasion 310-c and a failure to receive data transmitted in the transmission occasion 310-c (e.g., the receiving device may transmit a NACK in a feedback occasion 315-c corresponding to the transmission occasion 310-*c*). The receiving device may assume the encryption key was used in the transmission occasion 310-*c*, and update a receiving device parameter, leading to a key mismatch.

According to the techniques described herein, the transmitting device and the receiving device may synchronize parameters associated with the encryption key to avoid a key mismatch. In a first example, the transmitting device and the receiving device may each update a respective parameter at each transmission occasion 310 associated with the semi-static resource allocation, regardless of whether signaling is transmitted in the transmission occasion 310. In a second example, the transmitting device and the receiving device may each update the respective parameter based on a slot count, rather than at each transmission occasion 310. That is, the transmitting device and the receiving device may use an encryption key for a duration (e.g., a quantity of milliseconds, symbols, subslots, or slots), rather than a quantity of transmissions.

In a third example, the transmitting device may indicate a value of a transmitter parameter to the receiving device, such as in control signaling (e.g., including the control signaling 305) or in the signaling in each transmission occasion 310. Based on receiving the indicated value of the transmitter parameter, the receiving device may update a value of a receiver parameter (e.g., to match the indicated value of the transmitter parameter). For example, a DCI message may include a counter field (e.g., similar to a downlink assignment index). Additionally or alternatively, the transmitting device may include (e.g., piggyback) the counter field in signaling in a transmission occasion 310 to indicate a quantity of uses of the current encryption key.

In a fourth example, the receiving device may be enabled to identify the skipped transmission occasion 310-*c*. For example, in SPS downlink transmissions, the receiving device (e.g., a UE) may be enabled with a three-state feedback process for transmitting to the transmitting device in the feedback occasions 315. The feedback process may include an ACK, a NACK, and a third feedback state which may indicate the receiving device recognized the associated transmission occasion 310-*c* was skipped (e.g., based on DTX). The transmitting device may recognize, based on the DTX feedback transmitted in the feedback occasion 315-*c*, that the receiving device did not update a receiver parameter, or both the transmitting device and the receiving device may update respective parameters based on the DTX feedback.

Similarly, in CG uplink transmissions, the receiving device (e.g., a base station) may report DTX feedback (e.g., in a physical downlink control channel (PDCCH) transmitted in the feedback occasion 315-*c*) based on detecting a reference signal (e.g., a DMRS) in the skipped transmission occasion 310-*c*. The transmitting device (e.g., a UE) may transmit the reference signal even when there is no data to transmit in the skipped transmission occasion 310-*c*. The transmitting device may recognize that the receiving device did not update a receiver parameter based on the DTX feedback, or both the transmitting device and the receiving device may update respective parameters based on the DTX feedback.

In some examples, such as in sidelink communications between UEs, each transmission occasion 310 may be associated with a respective SCI message. The transmitting device may include an indication of the value of the transmitter parameter in an SCI message (e.g., an SCI-1 or SCI-2 message), and so the transmitting device and the receiving device may be aware of the quantity of uses of the encryption key with each SCI message.

Figure 4:
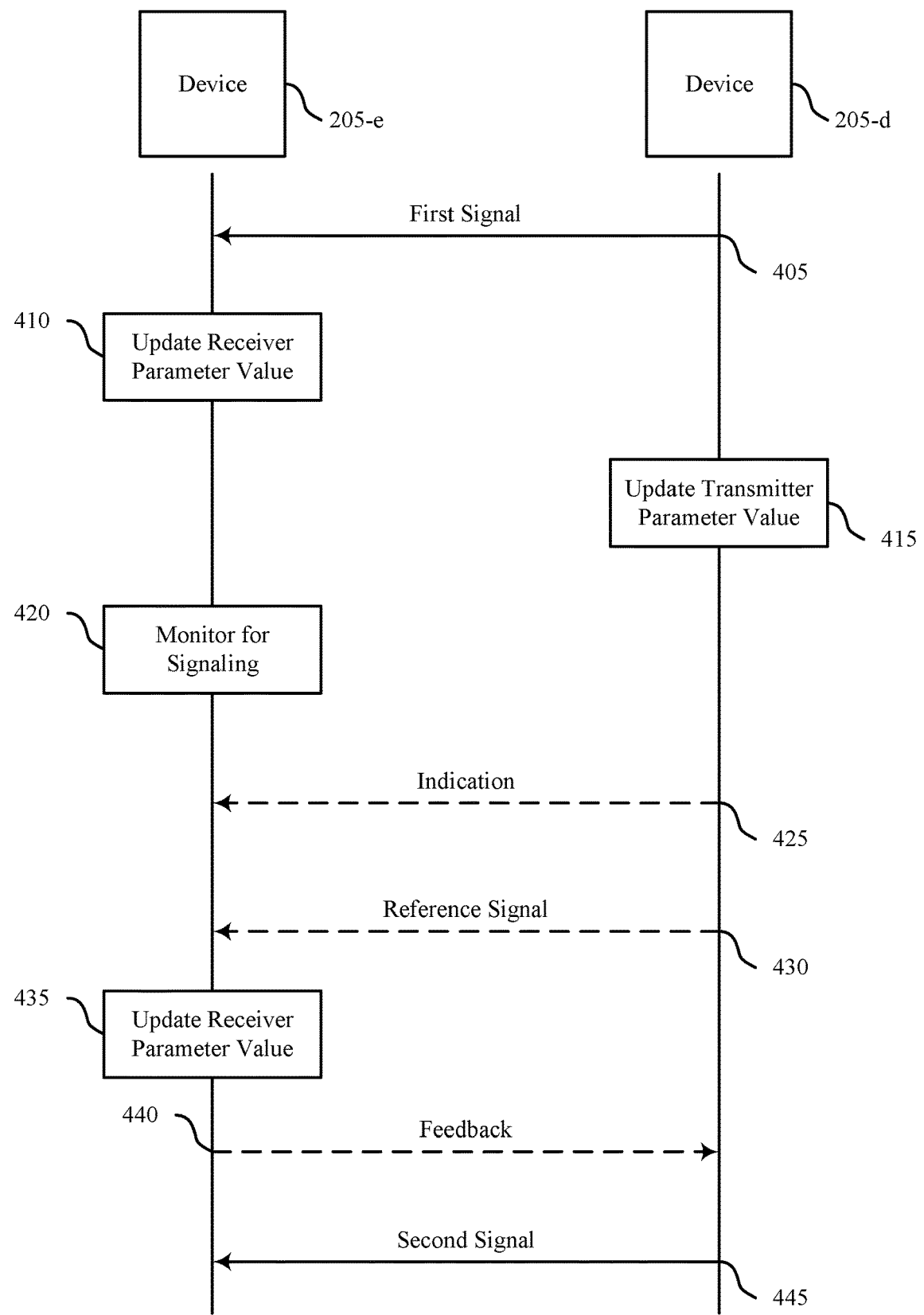
FIG. 4 illustrates an example of a process flow that supports techniques for parameter usage tracking for encryption in accordance with aspects of the present disclosure.

FIG. 4 illustrates an example of a process flow 400 that supports techniques for parameter usage tracking for encryption in accordance with aspects of the present disclosure. In some examples, the process flow 400 may implement one or more aspects of wireless communications systems 100 and 200. For example, the process flow 400 may include example operations associated with one or more devices 205, each of which may be an example of a UE 115 or a base station 105 described with reference to FIG. 1. In the following description of the process flow 400, the operations between the devices 205 may be performed in a different order than the example order shown, or the operations performed by the devices 205 may be performed in different orders or at different times. Some operations may also be omitted from the process flow 400, and other operations may be added to the process flow 400. The operations performed by the devices 205 may support improvements to data multiplexing operations and, in some examples, may increase communications reliability, among other benefits.

At 405, a device 205-*d* (which may be referred to as a transmitting device 205-*d*) may transmit a first signal to a device 205-*e* (which may be referred to as a receiving device 205-*e*) in a first transmission occasion associated with semi-statically allocated resources. The first signal may be encoded, encrypted, or scrambled using an encryption key based on a value of a transmitter parameter associated with the encryption key. In some examples, the semi-statically allocated resources may include SPS downlink transmissions, CG uplink transmissions, or CG sidelink transmissions. The device 205-*e* may decode the first signal based on a value of a receiver parameter associated with the encryption key.

At 410, the device 205-*e* may update the value of the receiver parameter (e.g., increment a value of a receiver counter) based on the encryption key being used for the first signal. Similarly the device 205-*d* may update the value of the transmitter parameter based on using the encryption key for the first signal.

At 415, the device 205-*d* may update the value of the transmitter parameter at a second transmission occasion associated with the semi-statically allocated resources, where the second transmission occasion may be a skipped (e.g., empty) transmission occasion. For example, the device 205-*d* may refrain from transmitting in the second transmission occasion if the device 205-*d* determines the device 205-*d* does not have data to send in the second transmission occasion or if the device 205-*d* determines channel conditions are unfavorable for transmitting in the second transmission occasion. In some examples, the device 205-*d* may increment a value of a transmitter counter associated with the encryption key to avoid a key mismatch, despite not transmitting in the second transmission occasion. Alternatively, the device 205-*d* may refrain from incrementing the value of the transmitter counter based on not transmitting in the second transmission occasion.

At 420, the device 205-*e* may monitor for signaling in the second transmission occasion. For example, based on the semi-statically allocated resources, the device 205-*e* may be scheduled to receive a transmission in the second transmission occasion. In some examples, the device 205-*e* may be unable to distinguish between a skipped transmission occasion and a transmission occasion in which the device 205-*e* fails to receive a scheduled transmission (e.g., the device 205-*e* may transmit a NACK in a feedback occasion corresponding to the second transmission occasion).

In some examples, at 425, the device 205-*d* may transmit to the device 205-*e* an indication of the updated value of the transmitter parameter to avoid a key mismatch. In some examples, the indication may be included in control signaling (e.g., a DCI message or an SCI message). Additionally or alternatively, the device 205-d may include the indication of the updated value of the transmitter parameter in signaling in each transmission occasion (e.g., including the first signal transmitted in the first transmission occasion).

In some examples, at 430, the device 205-d may transmit a reference signal (e.g., a DMRS or a sounding reference signal (SRS)) in the second transmission occasion. For example, in CG transmissions (e.g., uplink or sidelink), the device 205-d (e.g., a UE) may transmit the reference signal even when there is no data to transmit in the second transmission occasion.

At 435, the device 205-e may update the value of the receiver parameter based on monitoring for signaling in the second transmission occasion. For example, based on receiving the indication of the updated value of the transmitter parameter, the device 205-e may update the value of the receiver parameter to match the updated value of the transmitter parameter. Additionally or alternatively, the device 205-e may determine the second transmission occasion is a skipped transmission occasion based on receiving the reference signal, and update the value of the receiver parameter accordingly. In some examples, the device 205-e may increment a value of a receiver counter associated with the encryption key to avoid a key mismatch based on determining the second transmission occasion is a skipped transmission occasion. Alternatively, the device 205-e may refrain from incrementing the value of the receiver counter based on determining the second transmission occasion is a skipped transmission occasion.

In some examples, at 440, the device 205-e may transmit to the device 205-d feedback associated with the second transmission occasion. For example, in SPS downlink transmissions, the device 205-e (e.g., a UE) may be enabled with a three-state feedback process for transmitting to the device 205-e in the feedback occasion corresponding to the second transmission occasion. The feedback process may include an ACK, a NACK, and a third feedback state which may indicate the device 205-e recognized the second transmission occasion was skipped (e.g., based on DTX). The device 205-d may recognize, based on the DTX feedback transmitted in the feedback occasion, that the device 205-e did not update the value of the receiver parameter, or both the devices 205-d and 205-e may update respective parameters based on the DTX feedback.

Similarly, in CG transmissions, the device 205-e (e.g., a base station or a UE) may report DTX feedback based on detecting the reference signal in the second transmission occasion. The device 205-d may recognize that the device 205-e did not update the value of the receiver parameter based on the DTX feedback, or both the devices 205-d and 205-e may update respective parameters based on the DTX feedback.

At 445, the device 205-d may transmit a second signal in a third transmission occasion. The second signal may be encoded, encrypted, or scrambled using the encryption key based on the updated value of the transmitter parameter. The device 205-e may decode, decrypt, or descramble the second signal based on the updated value of the receiver parameter associated with the encryption key. In some examples, the third transmission occasion may be associated with the semi-statically allocated resources. In some examples, the third transmission occasion may be scheduled using a dynamic grant. By implementing one or more of the described techniques for synchronizing parameters associated with the encryption key, the devices 205 may be able to transmit data more reliably, among other benefits.

Figure 5:
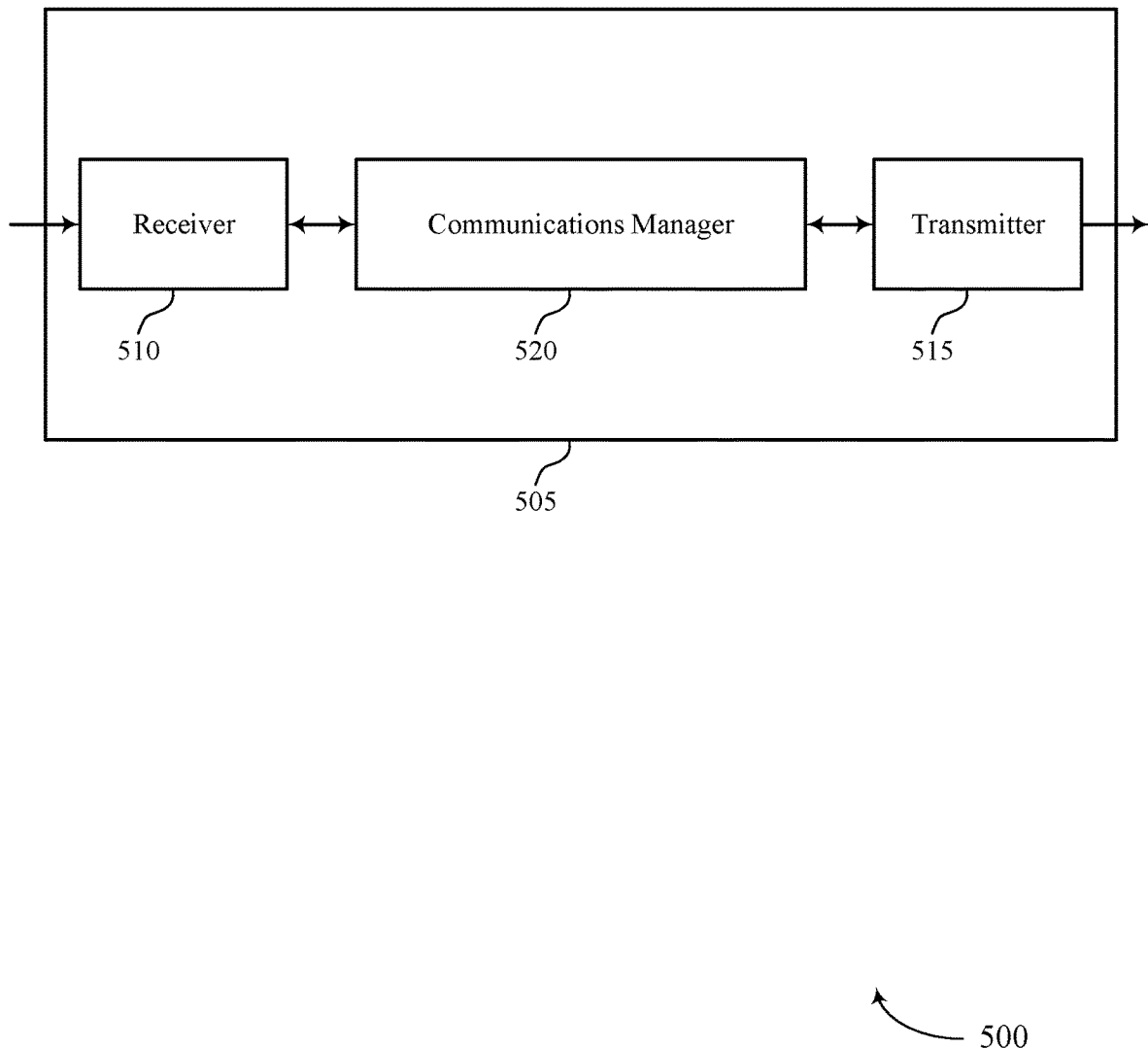
FIGS. 5 and 6 show block diagrams of devices that support techniques for parameter usage tracking for encryption in accordance with aspects of the present disclosure.

FIG. 5 shows a block diagram 500 of a device 505 that supports techniques for parameter usage tracking for encryption in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for parameter usage tracking for encryption). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for parameter usage tracking for encryption). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for parameter usage tracking for encryption as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a transmitting device in accordance with examples as disclosed herein. For example, the communications manager 520 may be configured as or otherwise support a means for transmitting, to a receiving device, a first signal in a first transmission occasion associated with semi-statically allocated resources, the first signal encoded based on a value of a transmitter parameter associated with an encryption key. The communications manager 520 may be configured as or otherwise support a means for updating the value of the transmitter parameter based on a second transmission occasion associated with the semi-statically allocated resources, the second transmission occasion including an empty transmission occasion. The communications manager 520 may be configured as or otherwise support a means for transmitting, to the receiving device, a second signal in a third transmission occasion after the second transmission occasion, the second signal encoded based on updating the value of the transmitter parameter.

Additionally or alternatively, the communications manager 520 may support wireless communication at a receiving device in accordance with examples as disclosed herein. For example, the communications manager 520 may be configured as or otherwise support a means for receiving, from a transmitting device, a first signal in a first transmission occasion associated with semi-statically allocated resources, the first signal decoded, decrypted, or descrambled at the receiving device based on a value of a receiver parameter associated with an encryption key. The communications manager 520 may be configured as or otherwise support a means for updating the value of the receiver parameter based on receiving the first signal in the first transmission occasion. The communications manager 520 may be configured as or otherwise support a means for monitoring for signaling in a second transmission occasion associated with the semi-statically allocated resources. The communications manager 520 may be configured as or otherwise support a means for updating the value of the receiver parameter based on monitoring for the signaling in the second transmission occasion. The communications manager 520 may be configured as or otherwise support a means for receiving, from the transmitting device, a second signal in a third transmission occasion after the second transmission occasion, the second signal decoded, decrypted, or descrambled at the receiving device based on updating the value of the receiver parameter.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, or more efficient utilization of communication resources.

Figure 6:
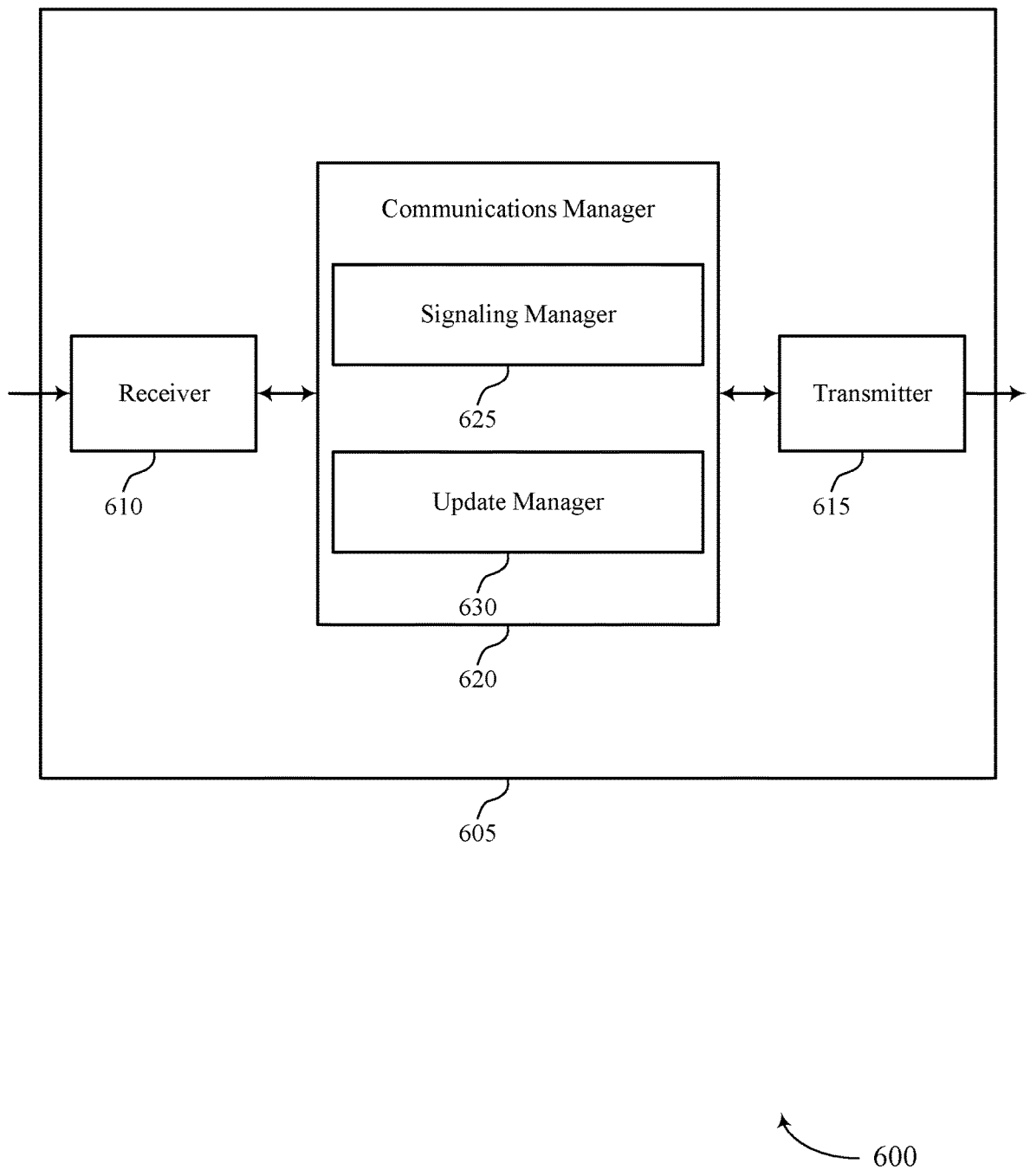

FIG. 6 shows a block diagram 600 of a device 605 that supports techniques for parameter usage tracking for encryption in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for parameter usage tracking for encryption). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for parameter usage tracking for encryption). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for parameter usage tracking for encryption as described herein. For example, the communications manager 620 may include a signaling manager 625 an update manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a transmitting device in accordance with examples as disclosed herein. The signaling manager 625 may be configured as or otherwise support a means for transmitting, to a receiving device, a first signal in a first transmission occasion associated with semi-statically allocated resources, the first signal encoded based on a value of a transmitter parameter associated with an encryption key. The update manager 630 may be configured as or otherwise support a means for updating the value of the transmitter parameter based on a second transmission occasion associated with the semi-statically allocated resources, the second transmission occasion including an empty transmission occasion. The signaling manager 625 may be configured as or otherwise support a means for transmitting, to the receiving device, a second signal in a third transmission occasion after the second transmission occasion, the second signal encoded based on updating the value of the transmitter parameter.

Additionally or alternatively, the communications manager 620 may support wireless communication at a receiving device in accordance with examples as disclosed herein. The signaling manager 625 may be configured as or otherwise support a means for receiving, from a transmitting device, a first signal in a first transmission occasion associated with semi-statically allocated resources, the first signal decoded at the receiving device based on a value of a receiver parameter associated with an encryption key. The update manager 630 may be configured as or otherwise support a means for updating the value of the receiver parameter based on receiving the first signal in the first transmission occasion. The signaling manager 625 may be configured as or otherwise support a means for monitoring for signaling in a second transmission occasion associated with the semi-statically allocated resources. The update manager 630 may be configured as or otherwise support a means for updating the value of the receiver parameter based on monitoring for the signaling in the second transmission occasion. The signaling manager 625 may be configured as or otherwise support a means for receiving, from the transmitting device, a second signal in a third transmission occasion after the second transmission occasion, the second signal decoded at the receiving device based on updating the value of the receiver parameter.

Figure 7:
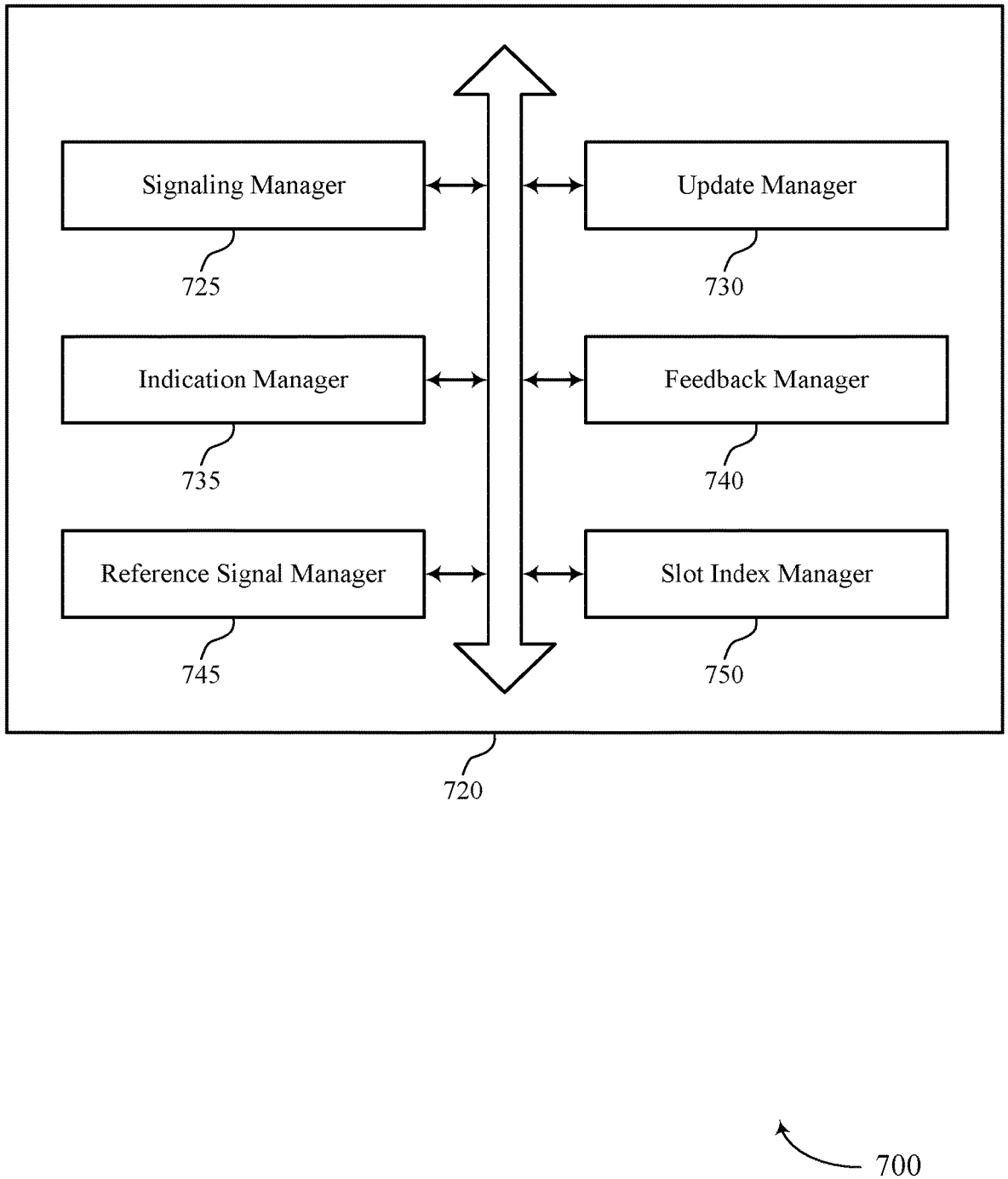
FIG. 7 shows a block diagram of a communications manager that supports techniques for parameter usage tracking for encryption in accordance with aspects of the present disclosure.

FIG. 7 shows a block diagram 700 of a communications manager 720 that supports techniques for parameter usage tracking for encryption in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for parameter usage tracking for encryption as described herein. For example, the communications manager 720 may include a signaling manager 725, an update manager 730, an indication manager 735, a feedback manager 740, a reference signal manager 745, a slot index manager 750, or any combination thereof. Each of these components may communicate, directly or indirectly, with one another (e.g., via one or more buses).

The communications manager 720 may support wireless communication at a transmitting device in accordance with examples as disclosed herein. The signaling manager 725 may be configured as or otherwise support a means for transmitting, to a receiving device, a first signal in a first transmission occasion associated with semi-statically allocated resources, the first signal encoded based on a value of a transmitter parameter associated with an encryption key. The update manager 730 may be configured as or otherwise support a means for updating the value of the transmitter parameter based on a second transmission occasion associated with the semi-statically allocated resources, the second transmission occasion including an empty transmission occasion. In some examples, the signaling manager 725 may be configured as or otherwise support a means for transmitting, to the receiving device, a second signal in a third transmission occasion after the second transmission occasion, the second signal encoded based on updating the value of the transmitter parameter.

In some examples, the indication manager 735 may be configured as or otherwise support a means for transmitting, to the receiving device, an indication of the updated value of the transmitter parameter based on updating the value of the transmitter parameter.

In some examples, the indication is included in the second signal in the third transmission occasion.

In some examples, the indication is included in a downlink control information message or a sidelink control information message.

In some examples, the feedback manager 740 may be configured as or otherwise support a means for receiving, from the receiving device, a feedback message corresponding to the second transmission occasion, where updating the value of the transmitter parameter is based on receiving the feedback message.

In some examples, the feedback message includes an acknowledgment, a negative acknowledgment, an indication of discontinuous transmission, or any combination thereof.

In some examples, the reference signal manager 745 may be configured as or otherwise support a means for transmitting, to the receiving device, a reference signal in the second transmission occasion, where updating the value of the transmitter parameter is based on transmitting the reference signal.

In some examples, the slot index manager 750 may be configured as or otherwise support a means for determining the value of the transmitter parameter based on a slot index corresponding to the second transmission occasion, where updating the value of the transmitter parameter is based on determining the value of the transmitter parameter.

In some examples, the signaling manager 725 may be configured as or otherwise support a means for refraining from transmitting signaling in the second transmission occasion, where updating the value of the transmitter parameter is based on refraining from transmitting the signaling.

In some examples, the semi-statically allocated resources are associated with a semi-persistent scheduling configuration or a configured grant configuration.

In some examples, the transmitter parameter includes a transmitter counter. In some examples, updating the value of the transmitter parameter includes incrementing a value of the transmitter counter.

In some examples, the transmitting device includes a base station and the receiving device includes a user equipment. In some examples, the transmitting device includes the user equipment and the receiving device includes the base station.

In some examples, the transmitting device includes a first user equipment and the receiving device includes a second user equipment.

Additionally or alternatively, the communications manager 720 may support wireless communication at a receiving device in accordance with examples as disclosed herein. In some examples, the signaling manager 725 may be configured as or otherwise support a means for receiving, from a transmitting device, a first signal in a first transmission occasion associated with semi-statically allocated resources, the first signal decoded at the receiving device based on a value of a receiver parameter associated with an encryption key. In some examples, the update manager 730 may be configured as or otherwise support a means for updating the value of the receiver parameter based on receiving the first signal in the first transmission occasion. In some examples, the signaling manager 725 may be configured as or otherwise support a means for monitoring for signaling in a second transmission occasion associated with the semi-statically allocated resources. In some examples, the update manager 730 may be configured as or otherwise support a means for updating the value of the receiver parameter based on monitoring for the signaling in the second transmission occasion. In some examples, the signaling manager 725 may be configured as or otherwise support a means for receiving, from the transmitting device, a second signal in a third transmission occasion after the second transmission occasion, the second signal decoded at the receiving device based on updating the value of the receiver parameter.

In some examples, the indication manager 735 may be configured as or otherwise support a means for receiving, from the transmitting device, an indication of an updated value of a transmitter parameter, where updating the value of the receiver parameter based on monitoring for the signaling in the second transmission occasion is further based on receiving the indication.

In some examples, the indication is received in the second signal in the third transmission occasion.

In some examples, the indication is received in a downlink control information message or a sidelink control information message.

In some examples, the feedback manager 740 may be configured as or otherwise support a means for transmitting, to the transmitting device, a feedback message corresponding to the second transmission occasion, where updating the value of the receiver parameter based on monitoring for the signaling in the second transmission occasion is further based on transmitting the feedback message.

In some examples, the feedback message includes an acknowledgment, a negative acknowledgment, an indication of discontinuous transmission, or any combination thereof.

In some examples, the reference signal manager 745 may be configured as or otherwise support a means for receiving, from the transmitting device, a reference signal in the second transmission occasion, where updating the value of the receiver parameter based on monitoring for the signaling in the second transmission occasion is further based on transmitting the reference signal.

In some examples, the slot index manager 750 may be configured as or otherwise support a means for determining the value of the receiver parameter based on a slot index corresponding to the second transmission occasion, where updating the value of the receiver parameter based on monitoring for the signaling in the second transmission occasion is further based on determining the value of the receiver parameter.

In some examples, the semi-statically allocated resources are associated with a semi-persistent scheduling configuration or a configured grant configuration.

In some examples, the receiver parameter includes a receiver counter. In some examples, updating the value of the receiver parameter includes incrementing a value of the receiver counter.

In some examples, the transmitting device includes a base station and the receiving device includes a user equipment. In some examples, the transmitting device includes the user equipment and the receiving device includes the base station.

In some examples, the transmitting device includes a first user equipment and the receiving device includes a second user equipment.

Figure 8:
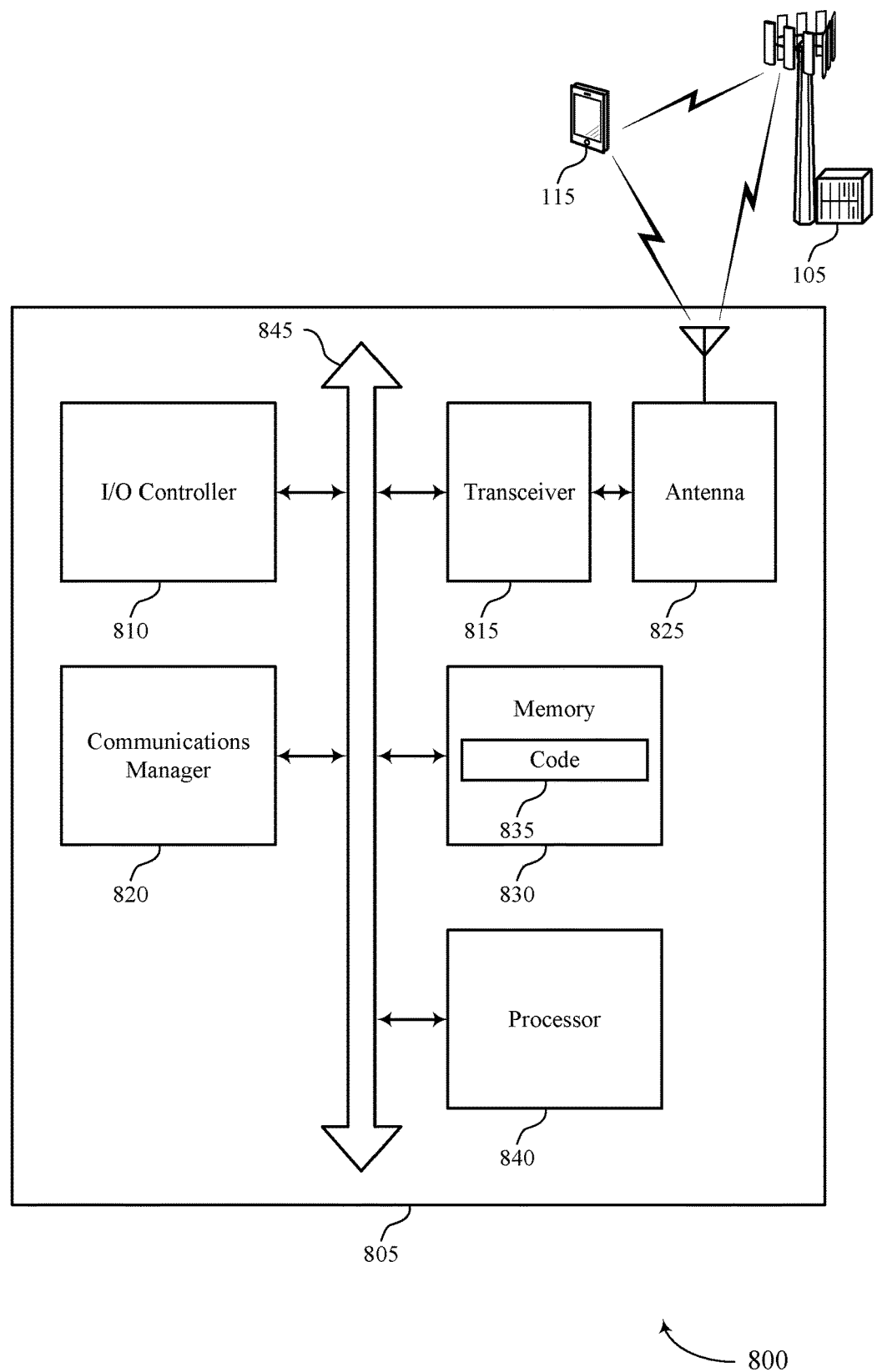
FIG. 8 shows a diagram of a system including a UE that supports techniques for parameter usage tracking for encryption in accordance with aspects of the present disclosure.

FIG. 8 shows a diagram of a system 800 including a device 805 that supports techniques for parameter usage tracking for encryption in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for parameter usage tracking for encryption). For example, the device 805 or a component of the device 805 may include a processor 840 and memory 830 coupled to the processor 840, the processor 840 and memory 830 configured to perform various functions described herein.

The communications manager 820 may support wireless communication at a transmitting device in accordance with examples as disclosed herein. For example, the communications manager 820 may be configured as or otherwise support a means for transmitting, to a receiving device, a first signal in a first transmission occasion associated with semi-statically allocated resources, the first signal encoded based on a value of a transmitter parameter associated with an encryption key. The communications manager 820 may be configured as or otherwise support a means for updating the value of the transmitter parameter based on a second transmission occasion associated with the semi-statically allocated resources, the second transmission occasion including an empty transmission occasion. The communications manager 820 may be configured as or otherwise support a means for transmitting, to the receiving device, a second signal in a third transmission occasion after the second transmission occasion, the second signal encoded based on updating the value of the transmitter parameter.

Additionally or alternatively, the communications manager 820 may support wireless communication at a receiving device in accordance with examples as disclosed herein. For example, the communications manager 820 may be configured as or otherwise support a means for receiving, from a transmitting device, a first signal in a first transmission occasion associated with semi-statically allocated resources, the first signal decoded at the receiving device based on a value of a receiver parameter associated with an encryption key. The communications manager 820 may be configured as or otherwise support a means for updating the value of the receiver parameter based on receiving the first signal in the first transmission occasion. The communications manager 820 may be configured as or otherwise support a means for monitoring for signaling in a second transmission occasion associated with the semi-statically allocated resources. The communications manager 820 may be configured as or otherwise support a means for updating the value of the receiver parameter based on monitoring for the signaling in the second transmission occasion. The communications manager 820 may be configured as or otherwise support a means for receiving, from the transmitting device, a second signal in a third transmission occasion after the second transmission occasion, the second signal decoded at the receiving device based on updating the value of the receiver parameter.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, or longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for parameter usage tracking for encryption as described herein, or the processor 840 and the memory 830 may be otherwise configured to perform or support such operations.

Figure 9:
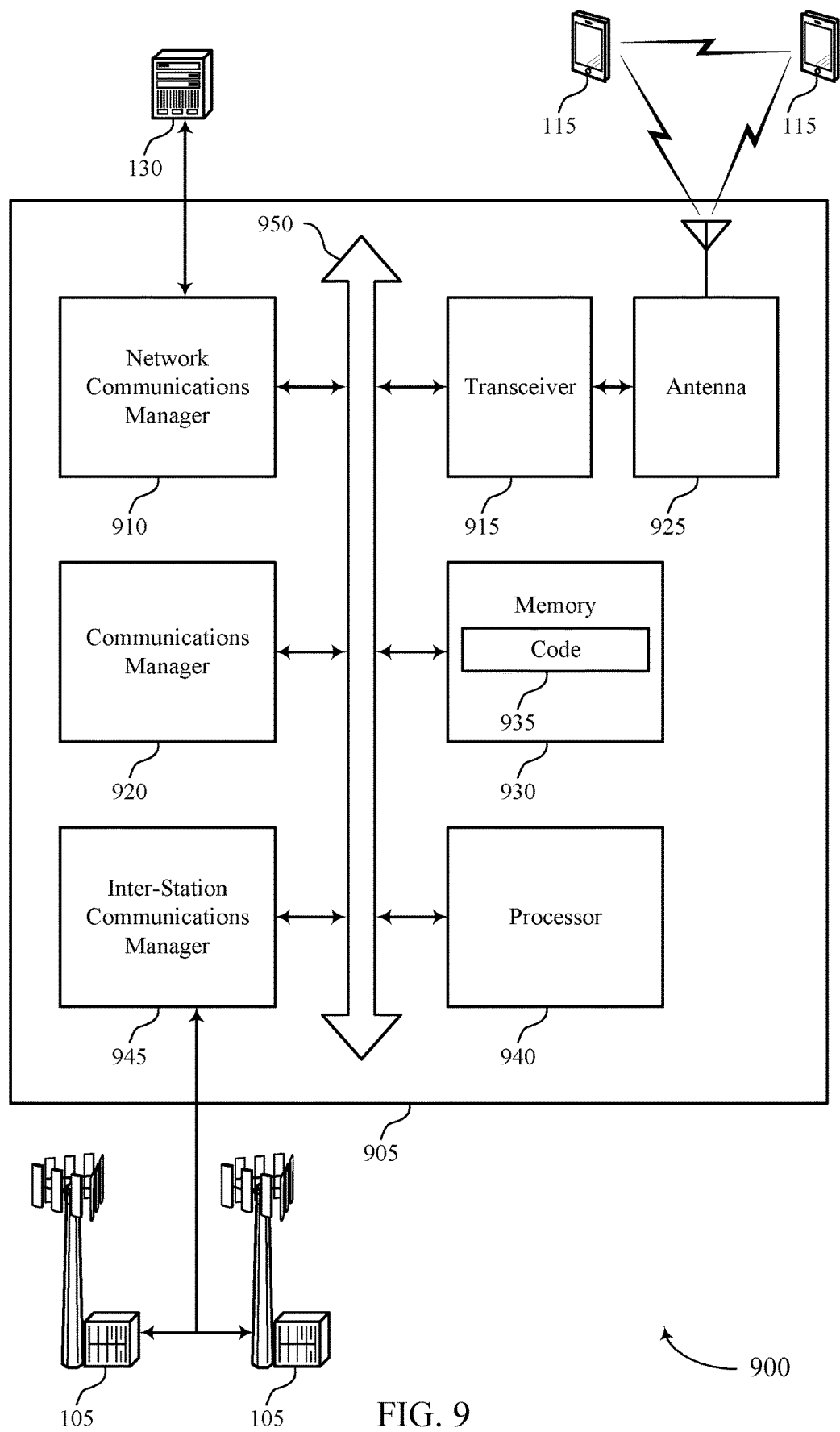
FIG. 9 shows a diagram of a system including a base station that supports techniques for parameter usage tracking for encryption in accordance with aspects of the present disclosure.

FIG. 9 shows a diagram of a system 900 including a device 905 that supports techniques for parameter usage tracking for encryption in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for parameter usage tracking for encryption). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a transmitting device in accordance with examples as disclosed herein. For example, the communications manager 920 may be configured as or otherwise support a means for transmitting, to a receiving device, a first signal in a first transmission occasion associated with semi-statically allocated resources, the first signal encoded based on a value of a transmitter parameter associated with an encryption key. The communications manager 920 may be configured as or otherwise support a means for updating the value of the transmitter parameter based on a second transmission occasion associated with the semi-statically allocated resources, the second transmission occasion including an empty transmission occasion. The communications manager 920 may be configured as or otherwise support a means for transmitting, to the receiving device, a second signal in a third transmission occasion after the second transmission occasion, the second signal encoded based on updating the value of the transmitter parameter.

Additionally or alternatively, the communications manager 920 may support wireless communication at a receiving device in accordance with examples as disclosed herein. For example, the communications manager 920 may be configured as or otherwise support a means for receiving, from a transmitting device, a first signal in a first transmission occasion associated with semi-statically allocated resources, the first signal decoded at the receiving device based on a value of a receiver parameter associated with an encryption key. The communications manager 920 may be configured as or otherwise support a means for updating the value of the receiver parameter based on receiving the first signal in the first transmission occasion. The communications manager 920 may be configured as or otherwise support a means for monitoring for signaling in a second transmission occasion associated with the semi-statically allocated resources. The communications manager 920 may be configured as or otherwise support a means for updating the value of the receiver parameter based on monitoring for the signaling in the second transmission occasion. The communications manager 920 may be configured as or otherwise support a means for receiving, from the transmitting device, a second signal in a third transmission occasion after the second transmission occasion, the second signal decoded at the receiving device based on updating the value of the receiver parameter.

By including or configuring the communications manager 920 in accordance with examples as described herein, the device 905 may support techniques for improved communication reliability, reduced latency, reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for parameter usage tracking for encryption as described herein, or the processor 940 and the memory 930 may be otherwise configured to perform or support such operations.

Figure 10:
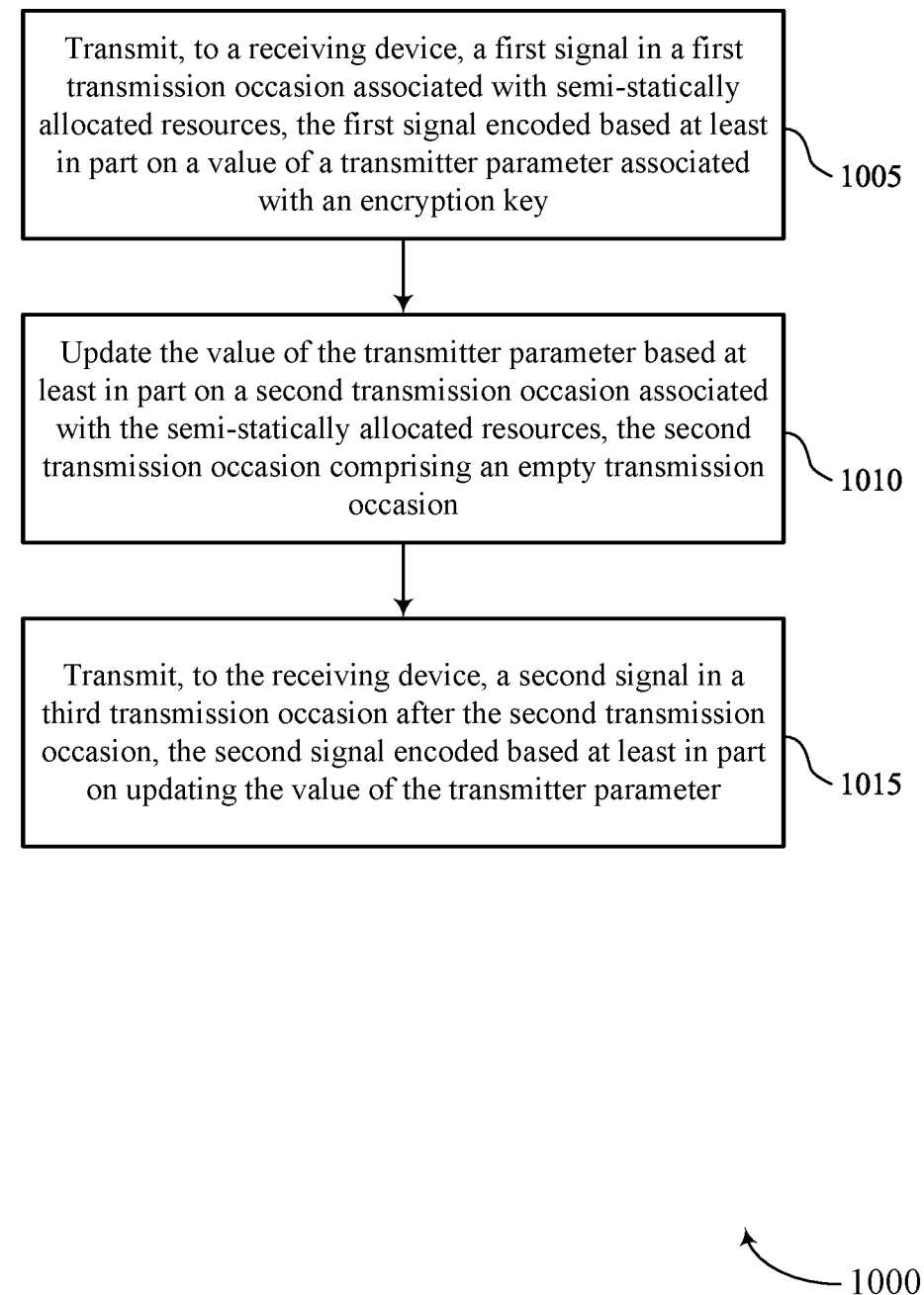
FIGS. 10 through 13 show flowcharts illustrating methods that support techniques for parameter usage tracking for encryption in accordance with aspects of the present disclosure.

FIG. 10 shows a flowchart illustrating a method 1000 that supports techniques for parameter usage tracking for encryption in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include transmitting, to a receiving device, a first signal in a first transmission occasion associated with semi-statically allocated resources, the first signal encoded based on a value of a transmitter parameter associated with an encryption key. The operations of 1005 may be performed in accordance with examples as disclosed herein. In some examples, aspects of the operations of 1005 may be performed by a signaling manager 725 as described with reference to FIG. 7.

At 1010, the method may include updating the value of the transmitter parameter based on a second transmission occasion associated with the semi-statically allocated resources, the second transmission occasion including an empty transmission occasion. The operations of 1010 may be performed in accordance with examples as disclosed herein. In some examples, aspects of the operations of 1010 may be performed by an update manager 730 as described with reference to FIG. 7.

At 1015, the method may include transmitting, to the receiving device, a second signal in a third transmission occasion after the second transmission occasion, the second signal encoded based on updating the value of the transmitter parameter. The operations of 1015 may be performed in accordance with examples as disclosed herein. In some examples, aspects of the operations of 1015 may be performed by a signaling manager 725 as described with reference to FIG. 7.

Figure 11:
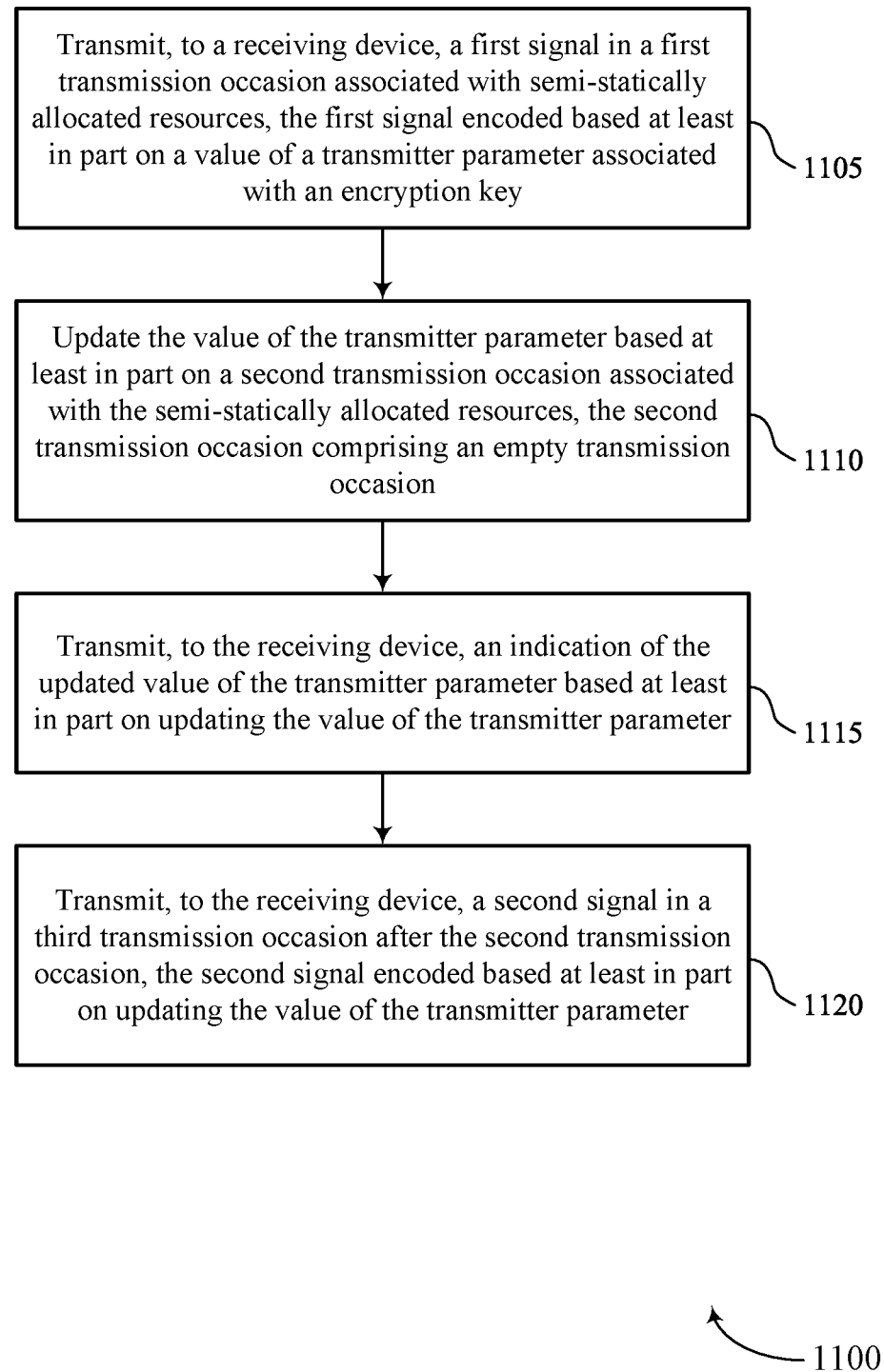

FIG. 11 shows a flowchart illustrating a method 1100 that supports techniques for parameter usage tracking for encryption in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include transmitting, to a receiving device, a first signal in a first transmission occasion associated with semi-statically allocated resources, the first signal encoded based on a value of a transmitter parameter associated with an encryption key. The operations of 1105 may be performed in accordance with examples as disclosed herein. In some examples, aspects of the operations of 1105 may be performed by a signaling manager 725 as described with reference to FIG. 7.

At 1110, the method may include updating the value of the transmitter parameter based on a second transmission occasion associated with the semi-statically allocated resources, the second transmission occasion including an empty transmission occasion. The operations of 1110 may be performed in accordance with examples as disclosed herein. In some examples, aspects of the operations of 1110 may be performed by an update manager 730 as described with reference to FIG. 7.

At 1115, the method may include transmitting, to the receiving device, an indication of the updated value of the transmitter parameter based on updating the value of the transmitter parameter. The operations of 1115 may be performed in accordance with examples as disclosed herein. In some examples, aspects of the operations of 1115 may be performed by an indication manager 735 as described with reference to FIG. 7.

At 1120, the method may include transmitting, to the receiving device, a second signal in a third transmission occasion after the second transmission occasion, the second signal encoded based on updating the value of the transmitter parameter. The operations of 1120 may be performed in accordance with examples as disclosed herein. In some examples, aspects of the operations of 1120 may be performed by a signaling manager 725 as described with reference to FIG. 7.

Figure 12:
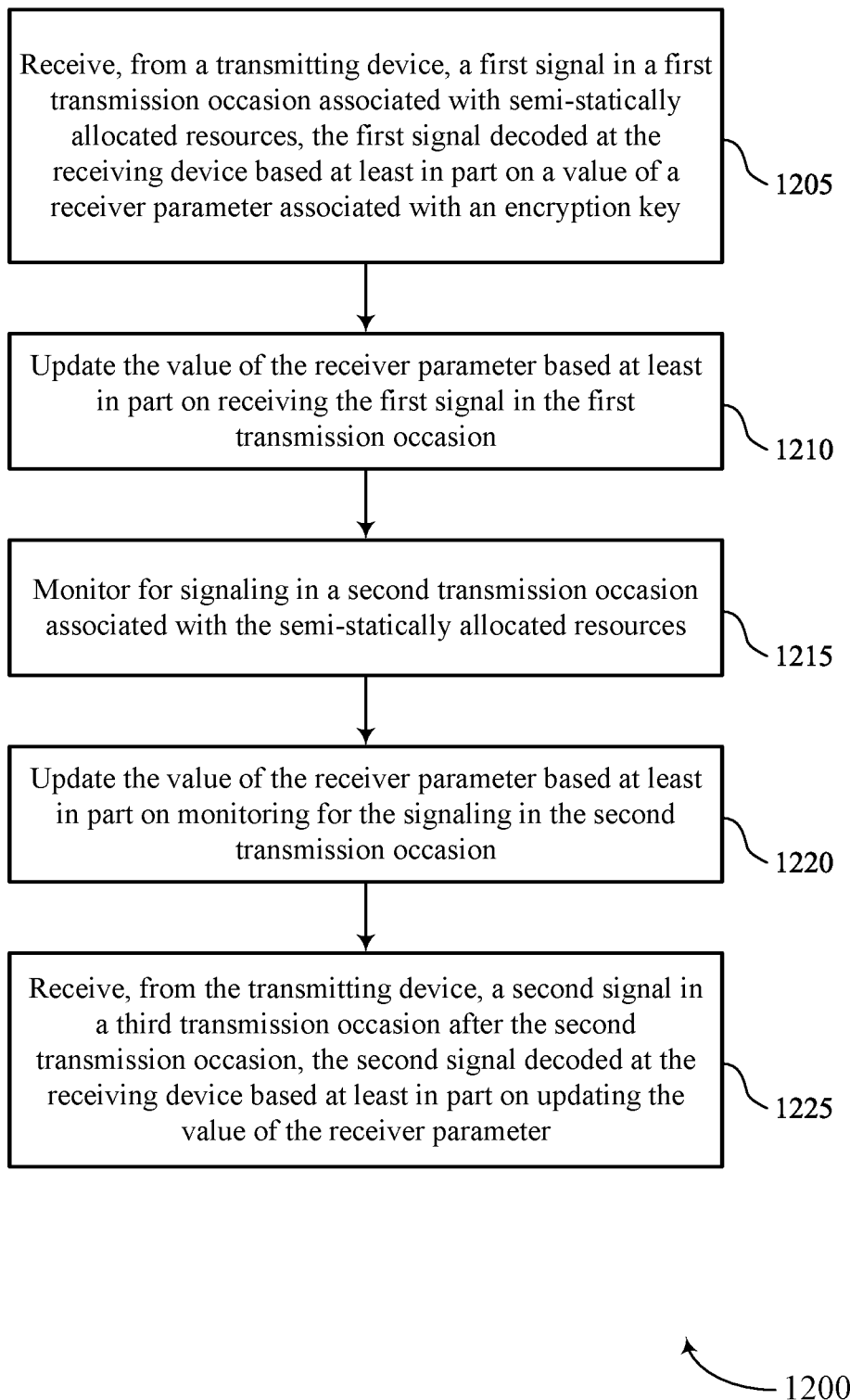

FIG. 12 shows a flowchart illustrating a method 1200 that supports techniques for parameter usage tracking for encryption in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, from a transmitting device, a first signal in a first transmission occasion associated with semi-statically allocated resources, the first signal decoded at the receiving device based on a value of a receiver parameter associated with an encryption key. The operations of 1205 may be performed in accordance with examples as disclosed herein. In some examples, aspects of the operations of 1205 may be performed by a signaling manager 725 as described with reference to FIG. 7.

At 1210, the method may include updating the value of the receiver parameter based on receiving the first signal in the first transmission occasion. The operations of 1210 may be performed in accordance with examples as disclosed herein. In some examples, aspects of the operations of 1210 may be performed by an update manager 730 as described with reference to FIG. 7.

At 1215, the method may include monitoring for signaling in a second transmission occasion associated with the semi-statically allocated resources. The operations of 1215 may be performed in accordance with examples as disclosed herein. In some examples, aspects of the operations of 1215 may be performed by a signaling manager 725 as described with reference to FIG. 7.

At 1220, the method may include updating the value of the receiver parameter based on monitoring for the signaling in the second transmission occasion. The operations of 1220 may be performed in accordance with examples as disclosed herein. In some examples, aspects of the operations of 1220 may be performed by an update manager 730 as described with reference to FIG. 7.

At 1225, the method may include receiving, from the transmitting device, a second signal in a third transmission occasion after the second transmission occasion, the second signal decoded at the receiving device based on updating the value of the receiver parameter. The operations of 1225 may be performed in accordance with examples as disclosed herein. In some examples, aspects of the operations of 1225 may be performed by a signaling manager 725 as described with reference to FIG. 7.

Figure 13:
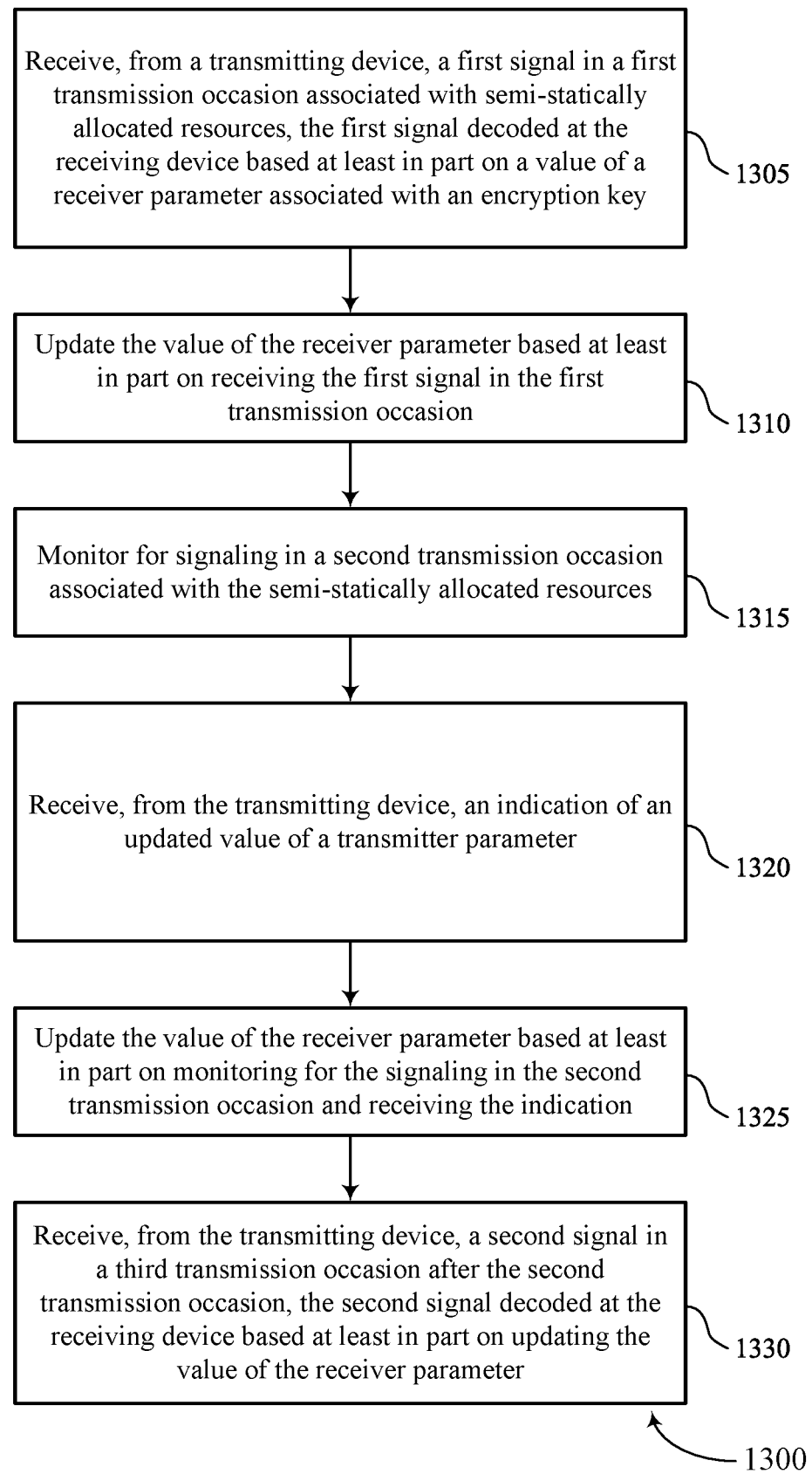

FIG. 13 shows a flowchart illustrating a method 1300 that supports techniques for parameter usage tracking for encryption in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, from a transmitting device, a first signal in a first transmission occasion associated with semi-statically allocated resources, the first signal decoded at the receiving device based on a value of a receiver parameter associated with an encryption key. The operations of 1305 may be performed in accordance with examples as disclosed herein. In some examples, aspects of the operations of 1305 may be performed by a signaling manager 725 as described with reference to FIG. 7.

At 1310, the method may include updating the value of the receiver parameter based on receiving the first signal in the first transmission occasion. The operations of 1310 may be performed in accordance with examples as disclosed herein. In some examples, aspects of the operations of 1310 may be performed by an update manager 730 as described with reference to FIG. 7.

At 1315, the method may include monitoring for signaling in a second transmission occasion associated with the semi-statically allocated resources. The operations of 1315 may be performed in accordance with examples as disclosed herein. In some examples, aspects of the operations of 1315 may be performed by a signaling manager 725 as described with reference to FIG. 7.

At 1320, the method may include receiving, from the transmitting device, an indication of an updated value of a transmitter parameter. The operations of 1320 may be performed in accordance with examples as disclosed herein. In some examples, aspects of the operations of 1320 may be performed by an indication manager 735 as described with reference to FIG. 7.

At 1325, the method may include updating the value of the receiver parameter based on monitoring for the signaling in the second transmission occasion and receiving the indication. The operations of 1325 may be performed in accordance with examples as disclosed herein. In some examples, aspects of the operations of 1325 may be performed by an update manager 730 as described with reference to FIG. 7.

At 1330, the method may include receiving, from the transmitting device, a second signal in a third transmission occasion after the second transmission occasion, the second signal decoded at the receiving device based on updating the value of the receiver parameter. The operations of 1330 may be performed in accordance with examples as disclosed herein. In some examples, aspects of the operations of 1330 may be performed by a signaling manager 725 as described with reference to FIG. 7.

The following provides an overview of aspects of the present disclosure:

Aspect 1: A method for wireless communication at a transmitting device, comprising: transmitting, to a receiving device, a first signal in a first transmission occasion associated with semi-statically allocated resources, the first signal encoded based at least in part on a value of a transmitter parameter associated with an encryption key; updating the value of the transmitter parameter based at least in part on a second transmission occasion associated with the semi-statically allocated resources, the second transmission occasion comprising an empty transmission occasion; and transmitting, to the receiving device, a second signal in a third transmission occasion after the second transmission occasion, the second signal encoded based at least in part on updating the value of the transmitter parameter.

Aspect 2: The method of aspect 1, further comprising: transmitting, to the receiving device, an indication of the updated value of the transmitter parameter based at least in part on updating the value of the transmitter parameter.

Aspect 3: The method of aspect 2, wherein the indication is included in the second signal in the third transmission occasion.

Aspect 4: The method of any of aspects 2 through 3, wherein the indication is included in a downlink control information message or a sidelink control information message.

Aspect 5: The method of any of aspects 1 through 4, further comprising: receiving, from the receiving device, a feedback message corresponding to the second transmission occasion, wherein updating the value of the transmitter parameter is based at least in part on receiving the feedback message.

Aspect 6: The method of aspect 5, wherein the feedback message comprises an acknowledgment, a negative acknowledgment, an indication of discontinuous transmission, or any combination thereof.

Aspect 7: The method of any of aspects 1 through 6, further comprising: transmitting, to the receiving device, a reference signal in the second transmission occasion, wherein updating the value of the transmitter parameter is based at least in part on transmitting the reference signal.

Aspect 8: The method of any of aspects 1 through 7, further comprising: determining the value of the transmitter parameter based at least in part on a slot index corresponding to the second transmission occasion, wherein updating the value of the transmitter parameter is based at least in part on determining the value of the transmitter parameter.

Aspect 9: The method of any of aspects 1 through 8, further comprising: refraining from transmitting signaling in the second transmission occasion, wherein updating the value of the transmitter parameter is based at least in part on refraining from transmitting the signaling.

Aspect 10: The method of any of aspects 1 through 9, wherein the semi-statically allocated resources are associated with a semi-persistent scheduling configuration or a configured grant configuration.

Aspect 11: The method of any of aspects 1 through 10, wherein the transmitter parameter comprises a transmitter counter; and updating the value of the transmitter parameter comprises incrementing the transmitter counter.

Aspect 12: The method of any of aspects 1 through 11, wherein the transmitting device comprises a base station and the receiving device comprises a user equipment; or the transmitting device comprises the user equipment and the receiving device comprises the base station.

Aspect 13: The method of any of aspects 1 through 12, wherein the transmitting device comprises a first user equipment and the receiving device comprises a second user equipment.

Aspect 14: A method for wireless communication at a receiving device, comprising: receiving, from a transmitting device, a first signal in a first transmission occasion associated with semi-statically allocated resources, the first signal decoded at the receiving device based at least in part on a value of a receiver parameter associated with an encryption key; updating the value of the receiver parameter based at least in part on receiving the first signal in the first transmission occasion; monitoring for signaling in a second transmission occasion associated with the semi-statically allocated resources; updating the value of the receiver parameter based at least in part on monitoring for the signaling in the second transmission occasion; and receiving, from the transmitting device, a second signal in a third transmission occasion after the second transmission occasion, the second signal decoded at the receiving device based at least in part on updating the value of the receiver parameter.

Aspect 15: The method of aspect 14, further comprising: receiving, from the transmitting device, an indication of an updated value of a transmitter parameter, wherein updating the value of the receiver parameter based at least in part on monitoring for the signaling in the second transmission occasion is further based at least in part on receiving the indication.

Aspect 16: The method of aspect 15, wherein the indication is received in the second signal in the third transmission occasion.

Aspect 17: The method of any of aspects 15 through 16, wherein the indication is received in a downlink control information message or a sidelink control information message.

Aspect 18: The method of any of aspects 14 through 17, further comprising: transmitting, to the transmitting device, a feedback message corresponding to the second transmission occasion, wherein updating the value of the receiver parameter based at least in part on monitoring for the signaling in the second transmission occasion is further based at least in part on transmitting the feedback message.

Aspect 19: The method of aspect 18, wherein the feedback message comprises an acknowledgment, a negative acknowledgment, an indication of discontinuous transmission, or any combination thereof.

Aspect 20: The method of any of aspects 14 through 19, further comprising: receiving, from the transmitting device, a reference signal in the second transmission occasion, wherein updating the value of the receiver parameter based at least in part on monitoring for the signaling in the second transmission occasion is further based at least in part on transmitting the reference signal.

Aspect 21: The method of any of aspects 14 through 20, further comprising: determining the value of the receiver parameter based at least in part on a slot index corresponding to the second transmission occasion, wherein updating the value of the receiver parameter based at least in part on monitoring for the signaling in the second transmission occasion is further based at least in part on determining the value of the receiver parameter.

Aspect 22: The method of any of aspects 14 through 21, wherein the semi-statically allocated resources are associated with a semi-persistent scheduling configuration or a configured grant configuration.

Aspect 23: The method of any of aspects 14 through 22, wherein the receiver parameter comprises a receiver counter; and updating the value of the receiver parameter comprises incrementing the receiver counter.

Aspect 24: The method of any of aspects 14 through 23, wherein the transmitting device comprises a base station and the receiving device comprises a user equipment; or the transmitting device comprises the user equipment and the receiving device comprises the base station.

Aspect 25: The method of any of aspects 14 through 24, wherein the transmitting device comprises a first user equipment and the receiving device comprises a second user equipment.

Aspect 26: An apparatus for wireless communication at a transmitting device, comprising a memory; and a processor coupled to the memory and configured to perform a method of any of aspects 1 through 13.

Aspect 27: An apparatus for wireless communication at a transmitting device, comprising at least one means for performing a method of any of aspects 1 through 13.

Aspect 28: A non-transitory computer-readable medium storing code for wireless communication at a transmitting device, the code comprising instructions executable by a processor to perform a method of any of aspects 1 through 13.

Aspect 29: An apparatus for wireless communication at a receiving device, comprising a memory; and a processor coupled to the memory and configured to perform a method of any of aspects 14 through 25.

Aspect 30: An apparatus for wireless communication at a receiving device, comprising at least one means for performing a method of any of aspects 14 through 25.

Aspect 31: A non-transitory computer-readable medium storing code for wireless communication at a receiving device, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. In a wireless communications system, an apparatus at a transmitting device comprising:
    a memory; and
    a processor coupled to the memory and configured to:
        transmit, to a receiving device, a first signal in a first transmission occasion associated with semi-statically allocated resources, the first signal encoded based at least in part on a value of a transmitter parameter associated with an encryption key;
        update the value of the transmitter parameter based at least in part on a second transmission occasion associated with the semi-statically allocated resources, the second transmission occasion comprising an empty transmission occasion; and
        transmit, to the receiving device, a second signal in a third transmission occasion after the second transmission occasion, the second signal encoded based at least in part on updating the value of the transmitter parameter.

2. The apparatus of claim 1, wherein the processor is further configured to:
    transmit, to the receiving device, an indication of the updated value of the transmitter parameter based at least in part on updating the value of the transmitter parameter.

3. The apparatus of claim 2, wherein the indication is included in the second signal in the third transmission occasion.

4. The apparatus of claim 2, wherein the indication is included in a downlink control information message or a sidelink control information message.

5. The apparatus of claim 1, wherein the processor is further configured to:
    receive, from the receiving device, a feedback message corresponding to the second transmission occasion, wherein updating the value of the transmitter parameter is based at least in part on receiving the feedback message.

6. The apparatus of claim 5, wherein the feedback message comprises an acknowledgment, a negative acknowledgment, an indication of discontinuous transmission, or any combination thereof.

7. The apparatus of claim 1, wherein the processor is further configured to:
    transmit, to the receiving device, a reference signal in the second transmission occasion, wherein updating the value of the transmitter parameter is based at least in part on transmitting the reference signal.

8. The apparatus of claim 1, wherein the processor is further configured to:
    determine the value of the transmitter parameter based at least in part on a slot index corresponding to the second transmission occasion, wherein updating the value of the transmitter parameter is based at least in part on determining the value of the transmitter parameter.

9. The apparatus of claim 1, wherein the processor is further configured to:
    refrain from transmitting signaling in the second transmission occasion, wherein updating the value of the transmitter parameter is based at least in part on refraining from transmitting the signaling.

10. The apparatus of claim 1, wherein the semi-statically allocated resources are associated with a semi-persistent scheduling configuration or a configured grant configuration.

11. The apparatus of claim 1, wherein:
the transmitter parameter comprises a transmitter counter; and
updating the value of the transmitter parameter comprises incrementing the transmitter counter.

12. The apparatus of claim 1, wherein:
the transmitting device comprises a base station and the receiving device comprises a user equipment; or
the transmitting device comprises the user equipment and the receiving device comprises the base station.

13. The apparatus of claim 1, wherein the transmitting device comprises a first user equipment and the receiving device comprises a second user equipment.

14. In a wireless communications system, an apparatus at a receiving device comprising:
a memory; and
a processor coupled to the memory and configured to:
receive, from a transmitting device, a first signal in a first transmission occasion associated with semi-statically allocated resources, the first signal decoded at the receiving device based at least in part on a value of a receiver parameter associated with an encryption key;
update the value of the receiver parameter based at least in part on receiving the first signal in the first transmission occasion;
monitor for signaling in a second transmission occasion associated with the semi-statically allocated resources;
update the value of the receiver parameter based at least in part on monitoring for the signaling in the second transmission occasion; and
receive, from the transmitting device, a second signal in a third transmission occasion after the second transmission occasion, the second signal decoded at the receiving device based at least in part on updating the value of the receiver parameter.

15. The apparatus of claim 14, wherein the processor is further configured to:
receive, from the transmitting device, an indication of an updated value of a transmitter parameter, wherein updating the value of the receiver parameter based at least in part on monitoring for the signaling in the second transmission occasion is further based at least in part on receiving the indication.

16. The apparatus of claim 15, wherein the indication is received in the second signal in the third transmission occasion.

17. The apparatus of claim 15, wherein the indication is received in a downlink control information message or a sidelink control information message.

18. The apparatus of claim 14, wherein the processor is further configured to:
transmit, to the transmitting device, a feedback message corresponding to the second transmission occasion, wherein updating the value of the receiver parameter based at least in part on monitoring for the signaling in the second transmission occasion is further based at least in part on transmitting the feedback message.

19. The apparatus of claim 18, wherein the feedback message comprises an acknowledgment, a negative acknowledgment, an indication of discontinuous transmission, or any combination thereof.

20. The apparatus of claim 14, wherein the processor is further configured to:
receive, from the transmitting device, a reference signal in the second transmission occasion, wherein updating the value of the receiver parameter based at least in part on monitoring for the signaling in the second transmission occasion is further based at least in part on transmitting the reference signal.

21. The apparatus of claim 14, wherein the processor is further configured to:
determine the value of the receiver parameter based at least in part on a slot index corresponding to the second transmission occasion, wherein updating the value of the receiver parameter based at least in part on monitoring for the signaling in the second transmission occasion is further based at least in part on determining the value of the receiver parameter.

22. The apparatus of claim 14, wherein the semi-statically allocated resources are associated with a semi-persistent scheduling configuration or a configured grant configuration.

23. The apparatus of claim 14, wherein:
the receiver parameter comprises a receiver counter; and
updating the value of the receiver parameter comprises incrementing the receiver counter.

24. The apparatus of claim 14, wherein:
the transmitting device comprises a base station and the receiving device comprises a user equipment; or
the transmitting device comprises the user equipment and the receiving device comprises the base station.

25. The apparatus of claim 14, wherein the transmitting device comprises a first user equipment and the receiving device comprises a second user equipment.

26. A method for wireless communication at a transmitting device, comprising:
transmitting, to a receiving device, a first signal in a first transmission occasion associated with semi-statically allocated resources, the first signal encoded based at least in part on a value of a transmitter parameter associated with an encryption key;
updating the value of the transmitter parameter based at least in part on a second transmission occasion associated with the semi-statically allocated resources, the second transmission occasion comprising an empty transmission occasion; and
transmitting, to the receiving device, a second signal in a third transmission occasion after the second transmission occasion, the second signal encoded based at least in part on updating the value of the transmitter parameter.

27. The method of claim 26, further comprising:
transmitting, to the receiving device, an indication of the updated value of the transmitter parameter based at least in part on updating the value of the transmitter parameter.

28. The method of claim 26, further comprising:
receiving, from the receiving device, a feedback message corresponding to the second transmission occasion, wherein updating the value of the transmitter parameter is based at least in part on receiving the feedback message.

29. A method for wireless communication at a receiving device, comprising:
receiving, from a transmitting device, a first signal in a first transmission occasion associated with semi-statically allocated resources, the first signal decoded at the receiving device based at least in part on a value of a receiver parameter associated with an encryption key;
updating the value of the receiver parameter based at least in part on receiving the first signal in the first transmission occasion;

monitoring for signaling in a second transmission occasion associated with the semi-statically allocated resources;

updating the value of the receiver parameter based at least in part on monitoring for the signaling in the second transmission occasion; and receiving, from the transmitting device, a second signal in a third transmission occasion after the second transmission occasion, the second signal decoded at the receiving device based at least in part on updating the value of the receiver parameter.

30. The method of claim 29, further comprising:

receiving, from the transmitting device, an indication of an updated value of a transmitter parameter, wherein updating the value of the receiver parameter based at least in part on monitoring for the signaling in the second transmission occasion is further based at least in part on receiving the indication.

\* \* \* \* \*